United States Patent [19]

Hjortzberg

[11] 4,217,603

[45] Aug. 12, 1980

[54] METHOD AND APPARATUS FOR PROCESSING COLOR TELEVISION SIGNALS

[75] Inventor: Bernhard A. Hjortzberg, Mission Viejo, Calif.

[73] Assignee: BASF Aktiengesellschaft, Rheinland-Pfalz, Fed. Rep. of Germany

[21] Appl. No.: 958,148

[22] Filed: Nov. 6, 1978

[51] Int. Cl.$^2$ .............................................. H04N 9/00
[52] U.S. Cl. ........................................ 358/12; 358/4; 358/8; 358/15; 358/16
[58] Field of Search ....................... 358/4, 8, 12, 15, 16

[56] References Cited

U.S. PATENT DOCUMENTS

| | | | |
|---|---|---|---|
| 3,617,620 | 11/1971 | Arimura | 358/4 |
| 3,717,725 | 2/1973 | Numakura | 358/4 |
| 3,764,739 | 10/1973 | Faroudja | 358/15 X |
| 4,117,509 | 9/1978 | Boer | 358/16 X |
| 4,123,774 | 10/1978 | Hjortzberg | 358/4 |

*Primary Examiner*—Robert L. Richardson

*Attorney, Agent, or Firm*—Fulwider, Patton, Rieber, Lee & Utecht

[57] ABSTRACT

Methods and apparatus for processing color television signals for recording and playback on a magnetic tape and for subsequent display on a conventional Phase Alternation Line (PAL)-type color television receiver. A number of embodiments of the invention are disclosed for converting both PAL and National Television Systems Committee (NTSC)-format color television signals to a transfer channel format for recording on the magnetic tape, and for converting the signal recovered from the tape to a special output format suitable for reception by a conventional PAL-type color television receiver. The special output format includes a chrominance subcarrier that has a fixed phase angle and that is amplitude modulated by a special combination of color difference signals. This special chrominance subcarrier can be produced without the need for a delay line and can be properly demodulated by a conventional PAL-type receiver as though it were in a conventional quadrature subcarrier format.

98 Claims, 9 Drawing Figures

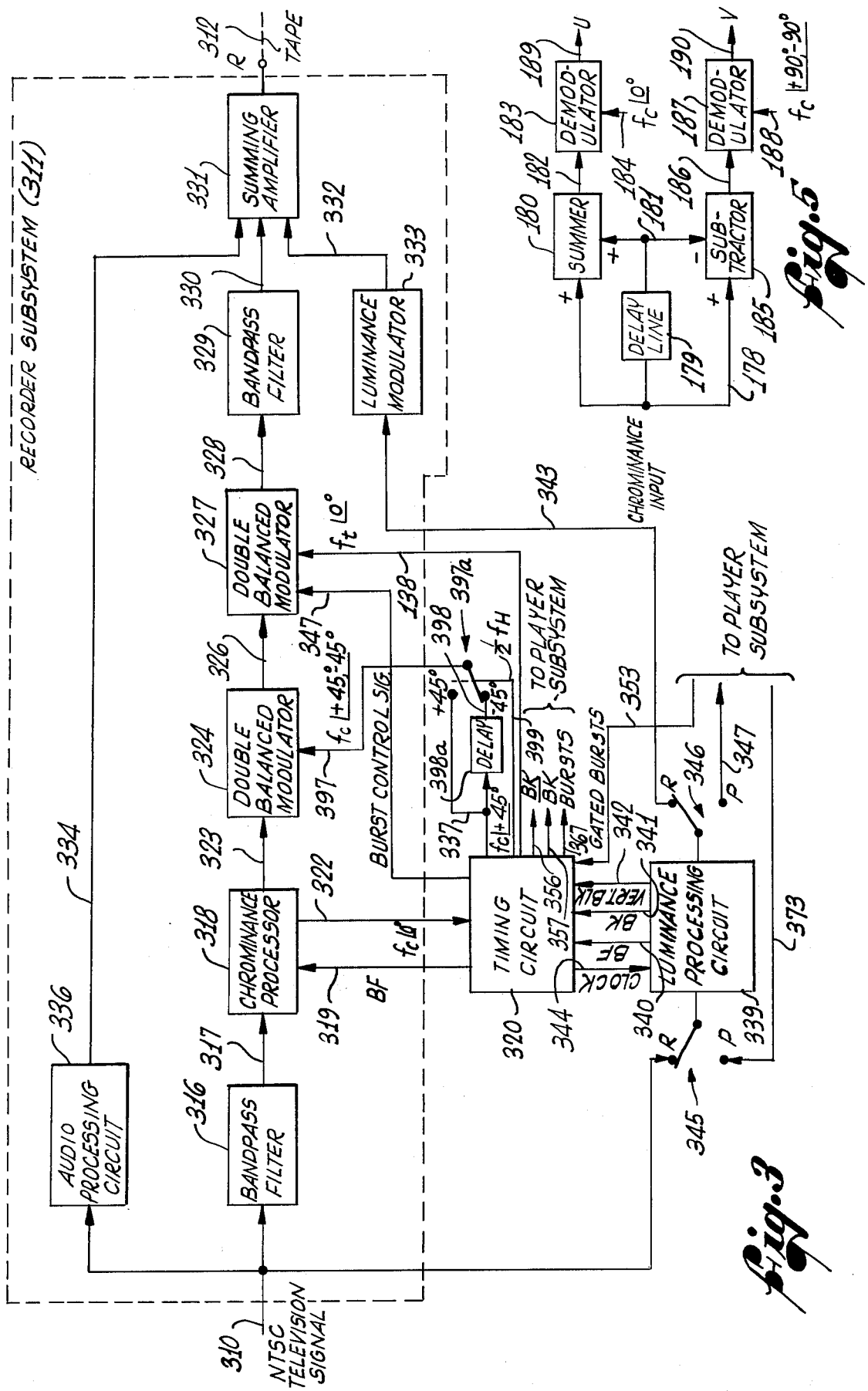

METHOD AND APPARATUS FOR PROCESSING COLOR TELEVISION SIGNALS

BACKGROUND OF THE INVENTION

This invention relates generally to techniques for processing color television signals and, more particularly, to methods and apparatus for converting color television signals from standard broadcast formats, such as the National Television Systems Committee (NTSC) format, used in the United States, or the Phase Alternation Line (PAL) format, used in much of Europe, to a transfer channel format and, after transmission over a transfer channel, converting the signals to a special output format suitable for reception and decoding by a conventional PAL receiver.

In video tape recording, television signals in the standard broadcast formats such as NTSC or PAL are unsuitable for recording directly on magnetic tape, because time base variations, which inevitably occur in the signal recovered from the tape, create unacceptable crosstalk between the various signal components. Hence, video tape recorders usually include apparatus for converting the broadcast format to a suitable transfer channel format, and for reconverting back to a broadcast format again, in order that the recorded information can be reproduced in a conventional television receiver. The present invention is principally concerned with such apparatus for use in situations in which the originally received signal (to be recorded) is in either NTSC or PAL format, and the conventional receiver used in the reproduction of the recorded signals is a PAL-type receiver.

First, by way of background, both NTSC and PAL format color television signals include a baseband luminance signal, an audio subcarrier and a quadrature modulated chrominance subcarrier. For NTSC, the chrominance subcarrier comprises one component at a phase angle of +33°, modulated by a first chrominance signal Q, and a quadrature component at a phase angle of +123°, modulated by a second chrominance signal I. The signals Q and I are derived from color difference signals B-Y and R-Y, where B is a signal representative of the color blue, R is a signal representative of the color red, and Y is a signal representative of luminance, in accordance with the following formulas:

$$Q = 0.41(B-Y) + 0.48(R-Y)$$

$$I = -0.27(B-Y) + 0.74(R-Y)$$

The PAL-format chrominance subcarrier, on the other hand, comprises one component at a phase angle of 0°, modulated by a color difference signal U, which is defined to be 0.493(B-Y), and a quadrature component at a phase angle that alternates on successive horizontal scan lines between +90° and −90°, modulated by a color difference signal V, which is defined to be 0.877(R-Y).

Chrominance bursts, which serve as a phase and frequency reference for the quadrature chrominance components, occur during the horizontal blanking intervals. NTSC bursts all occur at a phase angle of 180°, and PAL bursts alternate on successive horizontal lines between phase angles of +135° and −135°.

In the aforementioned co-pending application, there are disclosed a number of color television signal encoding devices employing techniques of the general type described above, for processing NTSC or PAL format signals. Each device disclosed in the prior application includes a recording subsystem to convert a television signal input to a special transfer channel format for insertion on a transfer channel such as magnetic recording tape, and a player subsystem to convert the signal recovered from the transfer channel substantially back to its original format. This special transfer channel format of the television signal placed on the transfer channel is the same for all the disclosed devices and includes frequency modulated luminance and audio subcarriers and a bi-sequential chrominance subcarrier, which is amplitude modulated with suppressed subcarrier on alternate horizontal lines, first by the color difference signal U (or 0.493(B-Y)) and then by the other color difference signal V (or 0.877(R-Y)).

In the recording subsystems of the disclosed devices, including both those for processing NTSC-format signals and those for processing PAL-format signals, the special transfer channel chrominance subcarrier is produced by mixing the broadcast format quadrature subcarrier with a locally generated reference signal that is derived from a reference having the same frequency as the quadrature subcarrier and having a phase angle switched on alternate horizontal scan lines between 0° and +90°. When the phase angle of the local reference is 0°, a chrominance subcarrier modulated by U is produced, and when the phase angle of the local reference is +90°, a subcarrier modulated by V is produced. For the disclosed PAL devices, the alternate lines in which the local reference has a phase angle of +90° must be synchronized with the alternate broadcast lines that includes a component modulated by +V, as contrasted with −V.

It will be noted that in all of the devices disclosed, the transfer channel chrominance subcarrier includes only one of the color difference signals, i.e., U or V, for each horizontal scan line, whereas the quadrature chrominance subcarrier to be re-created (PAL or NTSC) includes separate U and V components that are present simultaneously in each line. As a result, the player subsystems of each device must combine successive lines of chrominance information in the signal recovered from the transfer channel, to re-create the proper quadrature format.

In the player subsystems of the devices for processing NTSC-format signals, the quadrature chrominance subcarrier is re-created by first converting the line-sequential transfer channel chrominance subcarrier recovered from the transfer channel to a corresponding line-sequential subcarrier at the original quadrature subcarrier frequency. The phase angle of this latter subcarrier is switched between 0° for horizontal scan lines modulated by U and +90° for lines modulated by V. This switched phase subcarrier is then passed through a delay line to delay it by one horizontal line period, and, in turn, combined in a summing amplifier with the non-delayed switched phase subcarrier, to produce the NTSC-format quadrature chrominance subcarrier. Proper NTSC-format chrominance bursts are produced by summing in bursts having a phase angle of 180° during the horizontal blanking intervals.

Similarly, in the player subsystems of the devices for processing PAL-format signals, the quadrature chrominance subcarrier is re-created by converting the transfer channel chrominance subcarrier to a corresponding line-sequential subcarrier having the same frequency as the original quadrature subcarrier and having a phase angle switched between 0° for lines modulated by U and +90° for lines modulated by V. The devices also include a delay line for delaying the switched phase subcarrier by one horizontal line period, an inverter and switch combination for inverting the phase of the delayed signal on alternate horizontal lines, and a summing amplifier for combining the delayed subcarrier from the inverter and switch combination with the non-delayed subcarrier, to produce the quadrature chrominance subcarrier.

The inverter and switch combination is required in the PAL devices described above because the phase angle of the V component of the PAL-format quadrature chrominance subcarrier to be re-created must be switched on alternate lines between +90° and −90°. For those lines in which the line-sequential chrominance subcarrier being presently received is modulated by V, the switch automatically selects the non-inverted delayed signal (i.e. +U) to be supplied to the summing amplifier, whereby a quadrature subcarrier modulated by +U and +V is produced. On the other hand, for the alternate lines, in which the line-sequential chrominance subcarrier being presently received is modulated by U, the switch automatically selects the inverted delayed signal (i.e. −V) to be supplied to the summing amplifier, whereby a quadrature subcarrier modulated by +U and −V is produced.

Proper PAL-format chrominance bursts are produced in the PAL processing devices by summing the line-sequential switched phase chrominance subcarrier with bursts having a 180° phase angle during the horizontal blanking intervals of the lines modulated by +U and bursts having a +90° phase angle during the blanking intervals of the lines modulated by +V. By this technique, the summing amplifier will produce bursts having phase angles of +135° for those lines in which the inverter and switch combination produces a non-inverted delayed signal (and the quadrature subcarrier thereby produced is modulated by +U and +V), and −135° for the alternate lines in which the inverter and switch combination produces an inverted delayed signal (and the quadrature subcarrier thereby produced is modulated by +U and −V).

A major drawback to the aforedescribed devices for processing PAL-format color television signals arises because of their inclusion of a delay line in re-creating the quadrature modulated chrominance subcarrier. The inclusion of such delay lines necessarily increases both the complexity and the cost of the devices. Additionally, inclusion of a delay line creates a mis-registration of luminance and chrominance information in the video picture reproduced by a conventional PAL-type color television receiver. This results because half of the chrominance information is always delayed by one horizontal line period, while the luminance information is not delayed at all. Although such devices have provided satisfactory performance in some instances, there is still a need for a less complex and less expensive alternative that will provide improved performance.

Another drawback to the aforedescribed devices arises from inherent characteristics of the PAL-format and NTSC format signals, themselves. The maximum amplitude for the transfer channel chrominance subcarrier when modulated by the color difference signal V is about 3 db greater than its maximum amplitude when modulated by the color difference signal U. This results both in wasted dynamic range of the chrominance circuitry and a substantially lower signal-to-noise ratio for those alternate horizontal lines in which the lower level color difference signal is being produced.

An additional drawback affecting the devices that process PAL-format signals, arises because proper chrominance bursts are produced in the quadrature modulated subcarrier output only by summing together separate bursts occurring in successive horizontal blanking intervals of the bi-sequentially modulated subcarrier. As a result, it is not until the second horizontal line of chrominance information in each field that a burst with the proper phase will be produced. Accordingly, the quality of the color in a video picture reproduced from the color reproduction achieved by a conventional PAL-type television receiver to which such a prior device is coupled, may be adversely affected, at least to a limited degree.

It will be appreciated from the foregoing that there is still a need for improved apparatus for converting a standard broadcast format television signal to a transfer channel format and, in turn, to a format suitable for reception and decoding by a conventional PAL-type receiver, wherein such apparatus will provide proper chrominance bursts for all the horizontal lines in each frame, and potentially will utilize substantially the entire dynamic range of the chrominance circuitry on every horizontal line. Additionally, there is still a need for apparatus of this type that can be constructed without undue complexity or cost and, in particular, without the need for a delay line for delaying a signal by one horizontal line period. The present invention fulfills these needs.

SUMMARY OF THE INVENTION

This invention resides in improved methods and apparatus for converting either a PAL-format or NTSC-format color television signal to a transfer channel format for placement on a transfer channel such as magnetic recording tape, and, in turn, for converting the signal recovered from the channel to a special output format suitable for reception and decoding by a conventional PAL-type color television receiver.

In accordance with the invention, the special format of the television signal output of the apparatus includes a chrominance subcarrier that has a frequency $f_c$ and a fixed phase angle X, where X is any angle between 0° and 360°, other than 0°, 90°, 180° or 270°, and that is modulated on alternate horizontal lines by the following combinations of color difference signals: K(U sin X+V cos X) and K(U sin X−V cos X), where K is +1 when X is selected to be between 0° and 90° or 180° and 270°, and −1 when X is selected to be between 90° and 180° or 270° and 360°. An output in this format can be produced without the use of a delay line for delaying a signal by one horizontal line period and can be properly decoded by a conventional PAL-type receiver as though it were in a conventional PAL format.

This special format chrominance subcarrier can be produced by amplitude modulating a reference signal having a frequency $f_c$ and a fixed phase angle X, with a baseband signal that is alternately proportional to K(U sin X+V cos X) and K(U sin X−V cos X). For PAL processing systems, the baseband signal can be produced by demodulating the quadrature subcarrier with a reference signal having the same frequency and having a phase angle fixed at +K(90°−X). For NTSC processing systems, on the other hand, the baseband signal can be produced by demodulating the quadrature subcarrier with a coherent reference signal having a phase angle switched on alternate horizontal lines between $+K(90°-X)$ and $-K(90°-X)$.

The angle X is preferably selected to be $+45°$, whereby the chrominance portion of the television signal output produced by the apparatus reduces to a subcarrier that has a phase angle fixed at $+45°$ and that is modulated by a signal anternately proportional to $U+V$ and $U-V$.

More particularly, apparatus constructed in accordance with the present invention includes a recorder subsystem for receiving either a PAL-format or NTSC-format color television signal and converting it to the transfer channel format for placement on the transfer channel. The apparatus further includes a player subsystem for receiving the encoded signal recovered from the channel and converting it to the special output format suitable for conventional modulation of a carrier and proper reception and decoding by a conventional PAL-type receiver.

In one embodiment of the present invention, for use in receiving and processing a PAL-format television signal, the recorder subsystem includes means for receiving the PAL-format signal and separating the quadrature modulated chrominance subcarrier from the baseband luminance and audio subcarrier signals, and demodulation means for reducing the chrominance subcarrier to a baseband chrominance signal. This baseband signal is an alternating sequence comprising $U+V$ for one horizontal line, followed by $U-V$ for the next line. It is produced by mixing the chrominance subcarrier with a reference signal having a frequency the same as the subcarrier (i.e., $f_c$) and a phase angle fixed at $45°$ relative to the phase reference established by the chroma bursts of the PAL-format signal input.

The recorder subsystem of this embodiment further includes means for amplitude modulating a transfer channel chrominance subcarrier with the baseband chrominance signal and summing it with frequency modulated luminance and audio subcarriers, to produce the encoded television signal for placement on the transfer channel. The modulated subcarrier is suppressed and has a frequency $f_t$. In accordance with one aspect of the present invention, the transfer channel chrominance subcarrier is modulated on alternate lines by $U+V$ and $U-V$. The peak amplitude of the subcarrier when modulated by $U+V$ is only about 0.5 db greater than its peak amplitude when modulated by $U-V$, so substantially the entire dynamic range of the chrominance circuitry can be utilized during each horizontal line, and the peak signal-to-noise ratio for each line will be approximately the same.

In the same embodiment of the present invention, the player subsystem includes means for receiving the television signal recovered from the transfer channel and again separating the modulated chrominance subcarrier from the luminance and audio subcarriers, and demodulation means for reducing the separated chrominance subcarrier to a baseband chrominance signal identical to that produced in the recorder subsystem.

The player subsystem also includes modulation means for converting the baseband signal to a modulated subcarrier having a frequency $f_c$, the same as the original PAL-format chrominance subcarrier, and a phase angle fixed at $+45°$. It will be noted that the chrominance components U and V are both present in each horizontal line of this latter subcarrier, and that a conventional PAL-type color television receiver can properly decode it to derive the two components U and V. Thus, the need to re-create a quadrature chrominance subcarrier and the need for a delay line of one horizontal line period is obviated. This reduces complexity and cost and, additionally, avoids the creation of luminance and chrominance mis-registration in the reproduced video picture.

The player subsystem of this embodiment further includes means for summing appropriate PAL-format chrominance bursts with the modulated chrominance subcarrier, followed by means for summing the resultant signal with baseband luminance and audio subcarrier signals, to produce a television signal output having a special format suitable for modulation of a carrier and, in turn, proper reception and decoding by a conventional PAL-type television receiver.

In an alternative embodiment of the present invention, also for use in receiving and processing a PAL-type television signal, the intermediate steps of reducing to baseband the quadrature modulated chrominance subcarrier and the transfer channel chrominance subcarrer, are eliminated. Instead, the recorder subsystem includes means for converting the quadrature modulated subcarrier directly to the transfer channel chrominance subcarrier, and the player subsystem includes means for converting the transfer channel subcarrier directly to the special chrominance output subcarrier. This is accomplished in both cases by means for mixing the modulated subcarrier with a special reference signal derived by mixing a first reference having a frequency $f_t$ with a second reference having a frequency $f_c$ and a phase angle $+45°$. This special reference signal contains components having frequencies that are both the sum and difference of $f_c$ and $f_t$.

In all other respects, the alternative embodiment is the same as the first embodiment described above. It will be appreciated that since the recorder subsystems of both embodiments produce encoded signals having an identical transfer channel format, the recorder subsystem for one embodiment can be used effectively in combination with the player subsystem of the other embodiment.

In still another embodiment of the recorder subsystem of the present invention, this one for converting an NTSC-format television signal to the transfer channel format, the recorder subsystem is substantially the same as that of the first embodiment described above. The primary difference is that the phase of the reference signal supplied to the demodulation means, rather than remaining fixed at an angle of $+45°$, is switched on alternate horizontal lines between angles of $+45°$ and $-45°$. In this manner, the demodulation means produces a baseband chrominance signal comprising an alternating sequence proportional to the sum of the color difference signals, i.e., $U+V$, for one horizontal line, followed by the difference of the color difference signals, i.e., $U-V$, for the next line. It will be noted that this is the same baseband chrominance signal as is produced in the first embodiment described above.

In yet another embodiment of the recorder subsystem of the present invention, this one also for converting an NTSC format television signal to the transfer channel format, the recorder subsystem is substantially the same as that of the second embodiment of the invention described above. The primary difference is that the special reference signal supplied to the mixing means is derived by mixing a first reference having a frequency $f_t$, with a second reference having a frequency $f_c$ and a phase that is switched between angles of $+45°$ and $-45°$ for alternate horizontal lines. This produces a modulated transfer channel chrominance subcarrier identical to that produced in all of the above-described embodiments of the recorder subsystem.

In all of the above-described embodiments of the present invention, the visibility of cross-modulation of the chrominance signal and the luminance signal can be substantially eliminated by selecting $f_t$, the frequency of the transfer channel chrominance subcarrier, to be an odd multiple of one-fourth the horizontal line rate, or, alternatively, by selecting $f_t$ to be an odd multiple of one-half the horizontal line rate and successively reversing the phase angle of the subcarrier for alternate pairs of horizontal lines.

Still other aspects and advantages of the present invention will become apparent from the following more detailed description of the preferred embodiments, taken in conjunction with the accompanying drawings, which disclose, by way of example, the principles of the invention.

BRIEF DESCRIPTION OF THE DRAWINGS

In the accompanying drawings,

FIG. 3 is a simplified block diagram of another alternative embodiment of the recorder subsystem of the invention, for converting an NTSC-format television signal to the transfer channel format for recording on a magnetic tape;

FIG. 5 is a simplified block diagram of a portion of a conventional PAL-type television receiver, for processing a modulated chrominance subcarrier input to derive the two color difference signals, U and V;

DESCRIPTION OF THE PREFERRED EMBODIMENTS

As shown in the exemplary drawings, the present invention is embodied in apparatus having a recorder subsystem for receiving either a PAL-format or NTSC-format color television signal and encoding it into a transfer channel format for placement on a transfer channel such as magnetic recording tape, and, additionally, having a player subsystem for receiving the encoded signal recovered from the tape and converting it to a special PAL-compatible format output signal for processing by conventional techniques and transmission to a conventional PAL-type television receiver.

Figure 6:
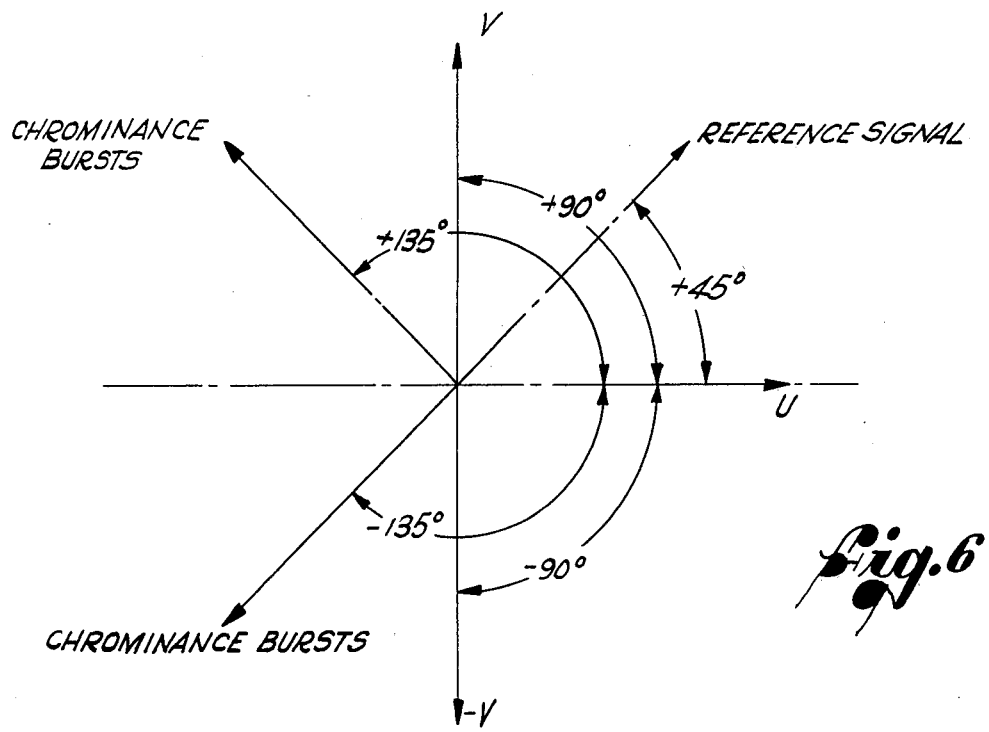
FIG. 6 is a vector diagram showing the relative phase angles of the components of a PAL-format quadrature chrominance subcarrier, with the phase angle of a reference signal utilized in the embodiments of FIGS. 1a and 1b and FIGS. 2a and 2b shown in phantom lines.
Figure 7:
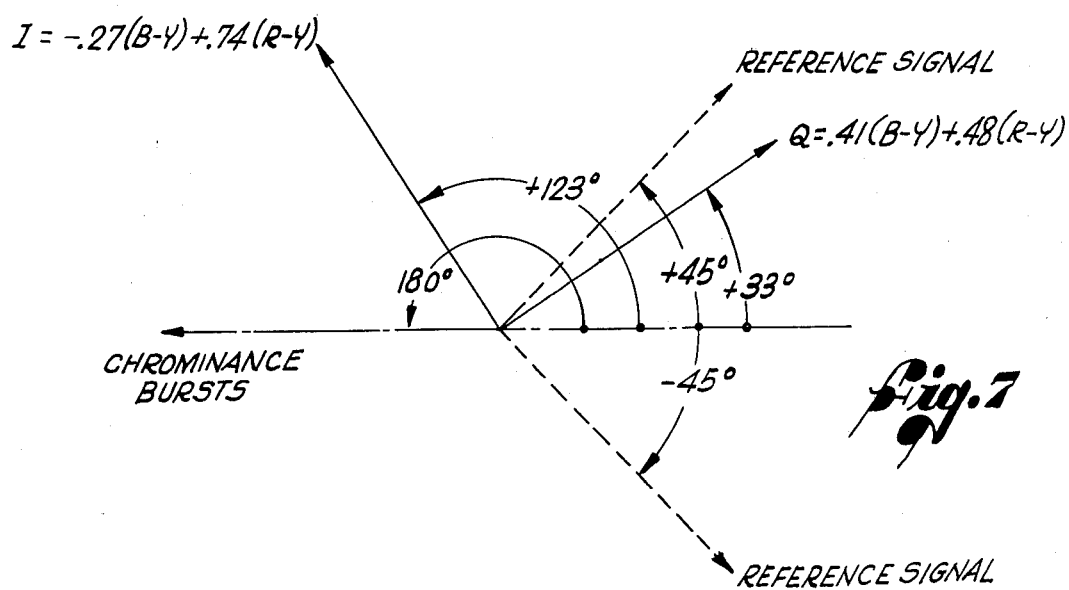
FIG. 7 is a vector diagram showing the relative phase angles of the components of an NTSC-format quadrature chrominance subcarrier, with the phase angles of a reference signal utilized in the embodiments of FIGS. 3 and 4 shown in phantom lines.

Briefly, it will be recalled that both NTSC and PAL format color television signals include a baseband luminance signal, an audio subcarrier and a quadrature modulated chrominance subcarrier. As depicted in FIG. 7, the NTSC chrominance subcarrier includes one component at a phase angle of 33° modulated by a color difference signal Q (i.e., 0.41(B-Y)+0.48(R-Y)), and a quadrature component at a phase angle of 123° modulated by a color difference signal I (i.e., −0.27(B-Y)+0.74(R-Y)). Chrominance bursts at a phase angle of 180° occur during the horizontal blanking intervals. As depicted in FIG. 6, the PAL chrominance subcarrier, on the other hand, includes one component at a phase angle of 0° modulated by U (or 0.493(B-Y)), and a quadrature component at a phase angle switched on alternate horizontal lines between +90° and −90° modulated by V (or 0.877(R-Y)). Chrominance bursts at a phase angle of +135° when the quadrature component is at +90°, and −135° when the quadrature component is at −90°, occur during the horizontal blanking intervals.

Figure 1A:
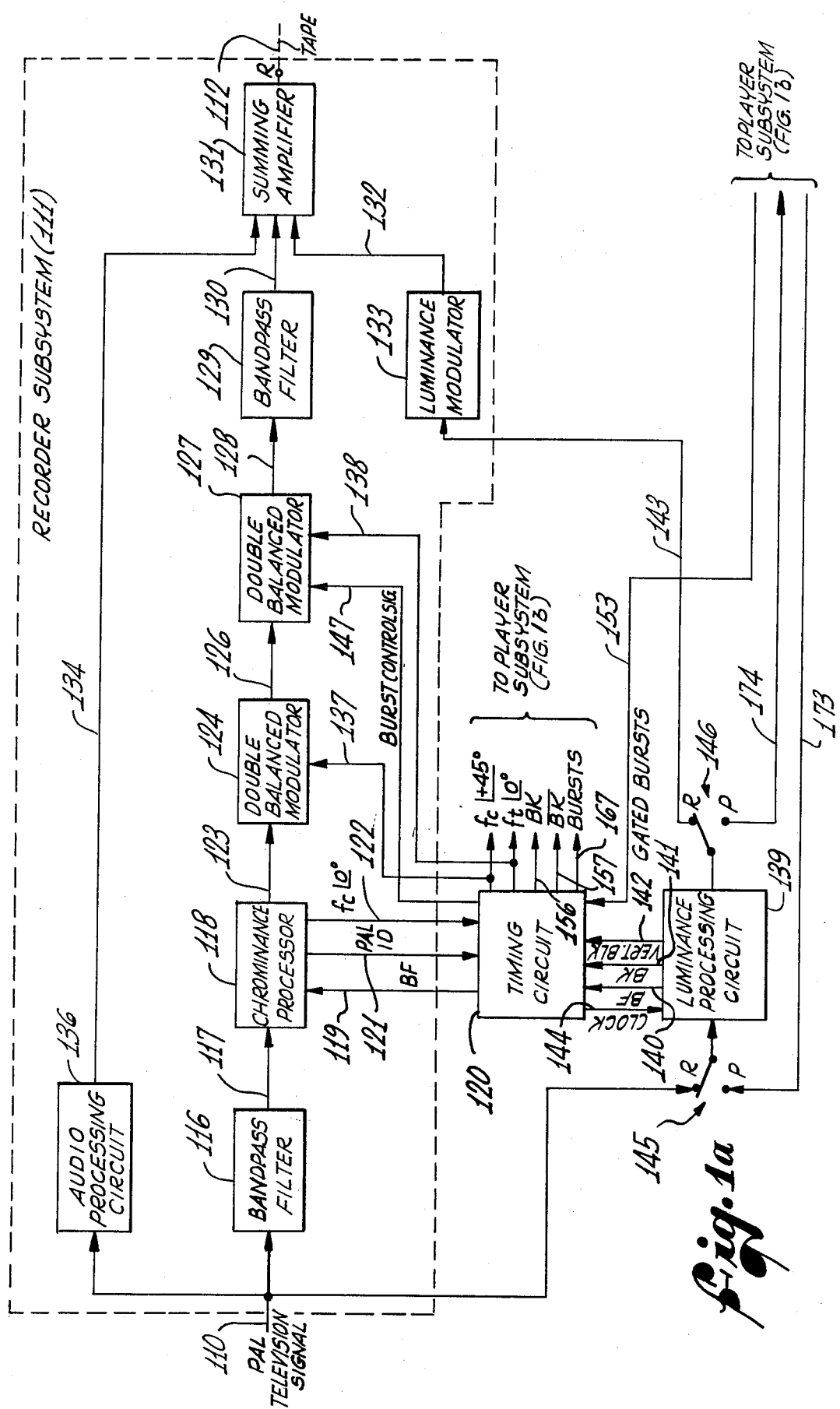
FIG. 1a is a simplified block diagram of a recorder subsystem constructed in accordance with the present invention, for converting a PAL-format television signal to a transfer channel format for recording on a magnetic tape.
Figure 1B:
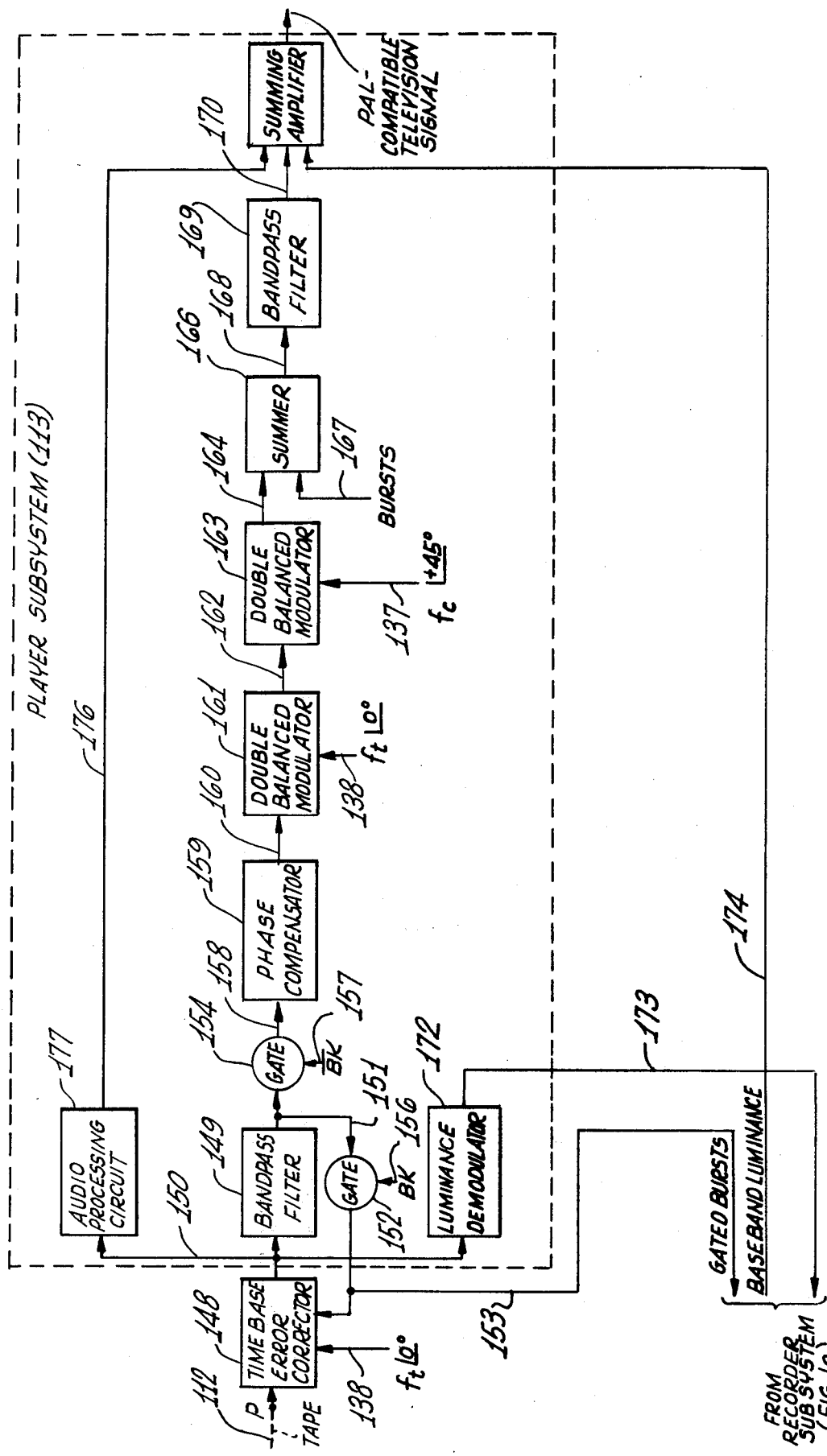
FIG. 1b is a simplified block diagram of a player subsystem constructed in accordance with the present invention, operable in combination with the apparatus of FIG. 1a to convert the encoded signal recovered from the magnetic tape to a special output format suitable for conventional reception, processing and decoding by a PAL-type television receiver.

FIGS. 1a and 1b together show one embodiment of the present invention, in which a PAL-format color television signal is received on line 110 and encoded by a recorder subsystem 111 (FIG. 1a) for placement on a magnetic recording tape 112. A player subsystem 113 (FIG. 1b) receives the encoded signal recovered from the tape and converts it to the special PAL-compatible format signal for output on line 114.

The recorder subsystem 111 of this embodiment includes a bandpass filter 116 to receive the color television signal input on line 110, and to separate the quadrature modulated chrominance subcarrier from the baseband luminance and audio subcarrier signals. The separated chrominance subcarrier is transmitted over line 117 to a chrominance processor 118, which is gated by a conventional burst flag signal supplied on line 119 from a timing circuit 120 and which produces a conventional PAL identification signal (PAL ID) and a chrominance subcarrier phase reference having a frequency of $f_c$ and a phase angle of 0° (i.e., $f_c \angle 0°$). The chrominance processor can include a Model uA787 linear integrated circuit, manufactured by Fairchild Camera and Instrument Corporation of Mountain View, California. The PAL ID signal and the phase reference $f_c \angle 0°$ are transmitted over lines 121 and 122, respectively, to the timing circuit 120 which, in turn, provides all the timing signals required for proper operation of the recorder and player subsystems of this embodiment.

The chrominance processor 118 also outputs a processed chrominance subcarrier for transmission on line 123 to one input port of a first double balanced modulator 124, which demodulates the subcarrier to baseband.

The resultant baseband chrominance signal is then transmitted over line 126 to one input port of a second double balanced modulator 127, which produces a modulated transfer channel chrominance subcarrier of frequency $f_t$ for transmission over line 128 to a bandpass filter 129.

A double balanced modulator is a conventional circuit that multiplies together the signals applied to its two input ports, to produce an output signal having components with frequencies that are both the sum and difference of the frequencies of the respective input signals. Such a modulator circuit is preferred for use herein, because the output signal it produces is free of interference from the respective input signals, and suppressed subcarrier modulation is thereby achieved automatically. Both modulators 124 and 127 can be conventional double balanced modulator-demodulator integrated circuits, such as type SL1596, manufactured by Plessey Microsystems of Santa Ana, California.

The bandpass filter 129 removes all undesired modulation components, including, in particular, those resulting from the sum frequency component produced by the first double balanced modulator 124. The filter subcarrier is then transmitted over line 130 to a summing amplifier 131, which sums it with frequency modulated luminance and audio subcarriers, to produce an encoded composite television signal for placement by conventional techniques on the magnetic tape 112.

The summing amplifier 131 receives the frequency modulated luminance subcarrier on line 132 from a luminance modulator 133 and the frequency modulated audio subcarrier on line 134 from an audio processing circuit 136. As specified in the aforementioned co-pending application for U.S. Patent, Ser. No. 766,541, the carrier frequencies and bandwidths of the luminance and audio subcarriers are selected to avoid interference with the modulated chrominance subcarrier. Examples of a suitable luminance modulator and a suitable audio processing circuit for producing these subcarrier signals are also disclosed in the co-pending application.

In accordance with one aspect of the invention, the transfer channel chrominance subcarrier is modulated, alternately, by U+V for one horizontal line and U−V for the next. In the embodiment shown in FIG. 1a, this is accomplished by applying appropriate reference signals, $f_c \angle +45°$ and $f_t \angle 0°$, over lines 137 and 138 to the respective second input ports of the first and second double balanced modulators 124 and 127.

The reference signal $f_c \angle +45°$ supplied over line 137 to the first modulator 124 has a frequency $f_c$ and a phase angle fixed at +45° (relative to the reference $f_c \angle 0°$ established by the chrominance processor 118). As shown in FIG. 6, then, the phase angle between this reference signal $f_c \angle +45°$ and the chrominance component U is always 45°, and the phase angle between the reference and the chrominance component V is, alternately, 45° for one line and 135° for the next. Accordingly, the baseband chrominance signal (i.e., the difference frequency component) produced by the first modulator is, alternately, proportional to U+V for one line and U−V for the next. The sum frequency component, of frequency $2f_c$, can be disregarded, because its effects are subsequently removed by the bandpass filter 129.

The reference signal $f_t \angle 0°$ supplied over line 138 to the second double balanced modulator 127 has a frequency $f_t$, which is an odd multiple of one fourth the horizontal line rate, and a relative phase angle fixed at 0°. This reduces visibility of cross-modulation of the chrominance and luminance signals, by causing the second harmonic of the chrominance subcarrier to have a phase angle that alternates in polarity for the same horizontal line on successive frames. Alternatively, as discussed in the aforementioned application, Ser. No. 766,541, the reference signal can have a frequency $f_t$ and a phase angle that alternates between 0° and 180° on adjacent pairs of horizontal lines, i.e., a repetitive sequence of 0° for two successive lines, followed by 180° for two successive lines.

The reference signals supplied to the two double balanced modulators 124 and 127 are produced by the timing circuit 120 in combination with a luminance processing circuit 139. In accordance with conventional techniques, the luminance processing circuit 139 receives and processes the PAL-format television input signal to produce a conventional burst flag (BF) signal, which includes a series of pulses coincident with the timing of the chrominance bursts, a conventional composite blanking (BK) signal, which includes a series of pulses extending for the duration of each horizontal blanking interval, and a conventional vertical blanking signal. These three signals are transmitted over lines 140, 141 and 142, respectively, to the timing circuit 120.

Additionally, the luminance processing circuit 139 separates the baseband luminance signal from the chrominance and audio subcarriers, and transmits it over lines 143 to the luminance modulator 133, which frequency modulates it preparatory to recording on the magnetic tape 112. The luminance processing circuit 139 can include a conventional television sync generator integrated circuit, such as a Model 3262, manufactured by Fairchild Camera and Instrument Corporation.

The timing circuit 120 produces the reference signal $f_c \angle +45°$ by delaying the chrominance phase reference $f_c \angle 0°$ supplied on line 122 from the chrominance processor 118, and produces the reference signal $f_t \angle 0°$ by locking its frequency to an odd multiple of one fourth the horizontal line rate (determined by the composite blanking signal BK supplied on line 141 from the luminance processing circuit 139). Suitable apparatus for producing the reference signal $f_t \angle 0°$ is disclosed in the aforementioned co-pending application, Ser. No. 766,541. Additionally, the timing circuit 120 transmits a clock signal over line 144 to the luminance processing circuit 139, for controlling its operation.

The luminance processing circuit 139 is associated with first and second manually actuated switches 145 and 146 located, respectively, at its television signal input and its baseband luminance signal output. These switches permit the circuit 139 to be used during both the step of recording a television signal on the tape 112 and the step of playing the signal back from the tape. When a record mode ("R") is selected, the switches couple the PAL-format television signal input to the circuit 139 for processing, and the baseband luminance signal produced by the circuit to the luminance modulator 133 for frequency modulation.

To aid in the correction of time base errors introduced into the composite television signal by the operations of recording and playing back the signal on the magnetic tape 112, the recorder subsystem includes means for inserting chrominance subcarrier bursts into the modulated transfer channel subcarrier for the duration of all but a selected few of the successive horizontal blanking intervals. In the embodiment shown in FIG. 1, this is accomplished by applying a burst control signal supplied on line 147 from the timing circuit 120 to a "gain adjust" input terminal of the second double balanced modulator 127, to unbalance the modulator during such intervals. As a result, the modulator 127 produces an unmodulated output corresponding to the reference signal $f_t\, 0°$ during those times.

The chrominance bursts for selected horizontal lines are eliminated so as to provide an indication of which lines correspond to U+V chrominance information, and which lines to U−V information. In the embodiment of FIG. 1a, the burst for every fourth horizontal line during the vertical blanking interval is eliminated, indicating that those lines (and alternate lines in synchronism with them) include U+V chrominance information. Since there are an odd number of horizontal lines in each video frame, the particular line or lines having eliminated bursts change from frame to frame. The timing circuit 12 can accomplish this line selection by gating together the vertical blanking signal received on line 142, the PAL ID signal received on line 121, and the output of a flip-flop (not shown) that is clocked by the PAL ID signal. The burst control signal can then be produced by gating the inverse of the resultant line selection signal with the composite blanking signal, BK.

In summary, then, the composite television signal produced by the recorder subsystem 111 for recording on the magnetic tape 112 includes frequency modulated luminance and audio subcarriers and an amplitude modulated chrominance subcarrier modulated on alternate lines by U+V and U−V, with the subcarrier being suppressed, and with unmodulated bursts of the chrominance subcarrier occurring for the duration of all but a selected few of the successive horizontal blanking intervals. The peak amplitude of the subcarrier will be about the same for all horizontal lines, so nearly the entire dynamic range of the chrominance circuitry can be utilized each line and the peak signal-to-noise ratio for each line will be approximately the same.

The player subsystem 113 shown in FIG. 1b operates in combination with the timing circuit 120 and luminance processing circuit 139 shown in FIG. 1a, to convert the composite television signal recovered from the magnetic tape 112 to the special output format suitable for modulation of a carrier and reception and decoding by a conventional PAL-type television receiver. Prior to its being processed by the player subsystem 113, the television signal recovered from the tape is processed by a time base error corector 148 to eliminate timing variations introduced during steps of recording and playing back the signal. The error corrector 148 variably delays the television signal, to synchronize the phase of the chrominance bursts in the television signal recovered from the tape to that of the reference signal $f_t\, \angle 0°$ supplied on line 138 from the timing circuit 120. An example of a suitable time base error correction technique that can be readily adapted for inclusion in the present device, is disclosed in an application for United States Patent, Ser. No. 728,550, filed Oct. 1, 1976 and entitled "Electronic Time Base Error Correction Methods and Arrangements".

In the embodiment of FIG. 1b, the receiver subsystem 113 includes a bandpass filter 149 to receive the composite television signal supplied on line 150 from the time base error corrector 148, and again separate the amplitude modulated transfer channel chrominance subcarrier from the frequency modulated luminance and audio subcarriers. The separated chrominance subcarrier is transmitted over line 151 to a first gate 152, which extracts the chrominance bursts occurring in the horizontal blanking intervals for transmission over line 153 back to the time base error corrector 148, and to a second gate 154, which removes the bursts to leave only the modulated subcarrier. The blanking pulse signal, BK, and its inverse, $\overline{BK}$, are supplied by the timing circuit 120 over lines 156 and 157 to the gates 152 and 154, respectively, to control their gating operation.

The modulated chrominance subcarrier is transmitted from the second gate 154 over line 158 to a phase compensator 159, which corrects for undesired phase variations introduced by the filtering of the signal, both by the bandpass filter 129 in the recorder subsystem 111 and by the bandpass filter 144 in the player subsystem 113. In turn, the phase compensated subcarrier is transmitted over line 160 to one input port of a first double balanced modulator 161, which demodulates it to a baseband signal corresponding to the baseband chrominance signal produced in the recorder subsystem of FIG. 1a. Applied to a second input port of the modulator 161 is the reference signal $f_t \angle 0°$, which is supplied on line 138 from the timing circuit 120. The phase angle of the subcarrier supplied to the modulator 161 is automatically aligned with that of the reference signal by operation of the time base error corrector 148.

The baseband chrominance signal produced by the first double balanced modulator 161 is then transmitted over line 162 to one input port of a second double balanced modulator 163, which amplitude modulates with suppressed subcarrier an output chrominance subcarrier, $f_c \angle +45°$, that is applied to a second input port of the modulator 163. The subcarrier $f_c \angle +45°$ is supplied on line 137 from the timing circuit 120 and can be derived from an oscillator (not shown) associated with the chrominance processor 118. The oscillator operates in an "open loop" fashion when the apparatus is processing a signal recovered from the tape 112, and no television signal is being received by the chrominance processor 118.

In accordance with the invention, the chrominance subcarrier produced by the second double balanced modulator 163 has a frequency $f_c$ and a phase angle fixed at $+45°$, and is amplitude modulated, on alternate lines, by U+V and U−V. It should be noted that this modulated subcarrier is substantially different in format from the original quadrature modulated chrominance subcarrier received by the recorder subsystem 111 of FIG. 1a.

The modulated output chrominance subcarrier produced by the second double balanced modulator 163 is transmitted over line 164 to a summer 166, which sums it with conventional PAL-format chrominance bursts (i.e., $+135°$ and $-135°$ on alternate lines) received over line 167 from the timing circuit 120. The $+135°$ chrominance bursts are produced for horizontal lines containing U+V chrominance information, and the $-135°$ bursts are produced for lines containing U−V information. Proper synchronization of the burst phase angle with the chrominance information can be accomplished in the timing circuit 120 by monitoring the gated transfer channel chrominance bursts supplied over line 153 from the gate 152, to detect the absence of bursts during those few selected horizontal lines in the vertical blanking interval. It will be recalled that lines having eliminated bursts (and alternate lines in synchronism with them) contain U+V chrominance information. When it is determined that a particular line is missing a burst, a flip-flop (not shown) being clocked by the periodic burst flag signal, BF, is reset, whereby the flip-flop is in the logical "one" state for lines containing U+V information, and the logical "zero" state for lines containing U−V information. The output of the flip-flop is used to alternately select between +135° and −135° phase references, both produced by appropriately delaying the +45° reference (i.e., $f_c \angle 45°$), and the PAL-format bursts for output on line 167 can then be produced by gating the selected phase reference with the burst flag signal, BF.

The chrominance subcarrier output produced by the summer 166 is transmitted over line 168 to a bandpass filter 169 for removal of all undesired modulation components and, in turn, over line 170 to a summing amplifier 171 for summing with a baseband luminance signal and a frequency modulated audio subcarrier.

The baseband luminance signal supplied to the summing amplifier 171 is originally produced by a luminance demodulator 172, located in the player subsystem 113 for demodulating the frequency modulated luminance subcarrier in the television signal received from the time base error corrector 148. When the manually actuated switches 145 and 146 associated with the luminance processing circuit 139 (FIG. 1a) are selectively positioned in a playback mode ("P") the baseband luminance signal produced by the luminance demodulator 172 is coupled via line 173 to the circuit 139. As it operated when the apparatus was in the record mode ("R"), the luminance processing circuit processes the television signal to produce the burst flag (BF) signal, the composite blanking (BF) signal and the vertical blanking signal for transmission over lines 140, 141 and 142 to the timing circuit. Additionally, the circuit 139 outputs the baseband luminance signal for transmission through the second switch 146 and over line 174 to the summing amplifier 171.

The audio subcarrier, which is supplied to the summing amplifier 171 on line 176 from an audio processing circuit 177, has a carrier frequency corresponding to that of the audio subcarrier in the original PAL-format television signal input received by the recorder subsystem 111 (FIG. 1a). Examples of a luminance demodulator and an audio processing circuit for producing such signals are disclosed in the aforementioned co-pending application for United States Patent, Ser. No. 766,541.

In summary, then, and in accordance with the invention, the player subsystem 113 shown in FIG. 1b produces a special PAL-compatible format television signal output comprising a baseband luminance signal, a frequency modulated audio subcarrier and a chrominance subcarrier that is amplitude modulated, sequentially and with a suppressed subcarrier, by U+V for one horizontal line and U−V for the next. Additionally, chrominance bursts having the proper phase angles (i.e., +135° and −135° on alternate lines) are provided for each line. The luminance and audio signals are both identical to the original luminance and audio signals included in the PAL-format television signal received by the recorder subsystem 111. The chrominance subcarrier, however, is substantially different from the quadrature modulated chrominance subcarrier in the original television signal. Nevertheless, the special format signal can be properly decoded by a conventional PAL-type television receiver as though the signal were in a conventional PAL format, and, moreover, the signal can be produced without the need for a costly delay line.

Referring now to FIG. 5, there is shown the chrominance demodulator portion of a conventional PAL-type television receiver, for demodulating the chrominance subcarrier and reproducing the two baseband color difference signals, U and V. The demodulator receives the chrominance subcarrier input on line 178 and delays it by one horizontal line period in a delay line 179. Additionally, the demodulator includes a pair of demodulation channels, one to demodulate U and the other to demodulate V.

The U demodulation channel includes a summer 180 for summing together the chrominance subcarrier input received on line 178 and the delayed subcarrier supplied on line 181 from the delay line 179. In turn, the output of the summer is transmitted over line 182 to a U demodulator circuit 183 for mixing with a reference signal $f_c \angle 0°$, which is received on line 184. The V demodulation channel includes a subtractor 185, which subtracts the delayed subcarrier from the subcarrier input and transmits the resultant difference signal over line 186 to a V demodulator circuit 187, for mixing with a reference signal $f_c \angle +90°, -90°$ received on line 188.

In normal use, the chrominance demodulator shown in FIG. 5 operates to demodulate a conventional PAL-format chrominance subcarrier, which includes a pair of quadrature subcarrier components, one at a phase angle of 0°, modulated by U, and the other at a phase angle alternating on successive lines between +90° and −90°, modulated by V. It will be appreciated, then, that in demodulating a conventional PAL-format chrominance subcarrier, the summer 180, which sums together the subcarriers for successive lines, produces a signal having a phase angle of 0°, modulated by 2U, since the components modulated by V will substantially cancel each other out. Similarly, the subtractor 185, which subtracts the subcarriers for successive lines, produces a signal having a phase angle that alternates between +90° and −90°, modulated by 2V, since the components modulated by U will substantially cancel each other out. Mixing by the U demodulator 183 of the summer output signal with the $f_c \angle 0°$ reference signal, then, produces the baseband color difference signal U, for output on line 189. Similarly, mixing by the V demodulator 187 of the subtractor output signal with the $f_c \angle +90°, -90°$ reference signal, then, produces the baseband color difference signal V, for output on line 190.

The conventional chrominance demodulator, shown in FIG. 5, also operates to demodulate the special PAL-compatible format chroma subcarrier produced by the apparatus of this invention, to produce the baseband color difference signals, U and V. The special format subcarrier, it will be recalled, is a line-sequential signal having a phase angle of +45° and modulated in an alternating fashion by U+V for one line, followed by U−V for the next.

In demodulating this special format chrominance subcarrier, the summer 180 produces a signal having a phase angle of +45° and modulated by +2U that is, in turn, demodulated by the U demodulator 183 to produce the baseband color difference signal, U. Similarly, the subtractor 185 produces a signal having a phase angle of +45° and modulated, alternately, by +2V and −2V, that is, in turn, demodulated by the V demodulator 187 to produce the other color difference signal, V.

Moreover, it will be appreciated that the conventional PAL-type chrominance democulator, shown in FIG. 5, also operates to properly demodulate a chrominance subcarrier in a generalized output format of apparatus in accordance with the present invention. The generalized-format subcarrier, it will be recalled, comprises a subcarrier of frequency $f_c$ and phase angle X (where X is any fixed angle between 0° and 360°, other than 0°, 90°, 180° or 270°), amplitude modulated on alternate horizontal lines by K[U sin(X)+V cos(X)] and K[U sin(X)−V cos(X)], where K is +1 when X is selected to be between 0° and 90° or 180° and 270°, and −1 when X is selected to be between 90° and 180° or 270° and 360°.

In demodulating this generalized-format chrominance subcarrier, the summer 180 continuously sums together the subcarrier for the current horizontal line and the subcarrier for the previous line, to produce a signal having a phase angle X and modulated by [2 K sin(X)] U. This signal is, in turn, transmitted on line 182 to the U demodulator 183, where it is mixed with the reference signal $f_c \angle 0°$ received on line 184. The phase difference between these two signals is the angle X, so the U demodulator 183 produces a baseband signal [2 K sin(X) cos(X)] U, where the factor 2 K sin(X) and cos(X) is positive for all values of X.

Similarly, the subtractor 185 continuously subtracts the subcarrier for the previous horizontal line from the subcarrier for the current line, to produce a signal having a phase angle X and modulated on alternate lines by +[2 K cos(X)] V and −[2 K cos(X)] V. This signal is, in turn, transmitted on line 186 to the V demodulator 187, where it is mixed with the reference signal $f_c \angle +90°, -90°$ received on line 188. The phase difference between these two signals alternates between the angles (X−90°) and (X−(−90°)), so the V demodulator 187 produces a baseband signal that is alternately expressed as +[2 K cos(X) cos(X−90°)] V and −[2 K cos(X) cos(X−(−90°))] V. Both of these expressions are equivalent to +[2 K cos(X) sin(X)] V, where the factor 2 K cos(X) sin(X) is positive for all values of X and is identical to the factor present in the output produced by the U demodulator 183. Thus, the nominal gains of the respective U and V demodulator channels are equal, and the PAL demodulator properly demodulates the generalized-format subcarrier of the present invention as though it were in a conventional PAL format.

Figure 2A:
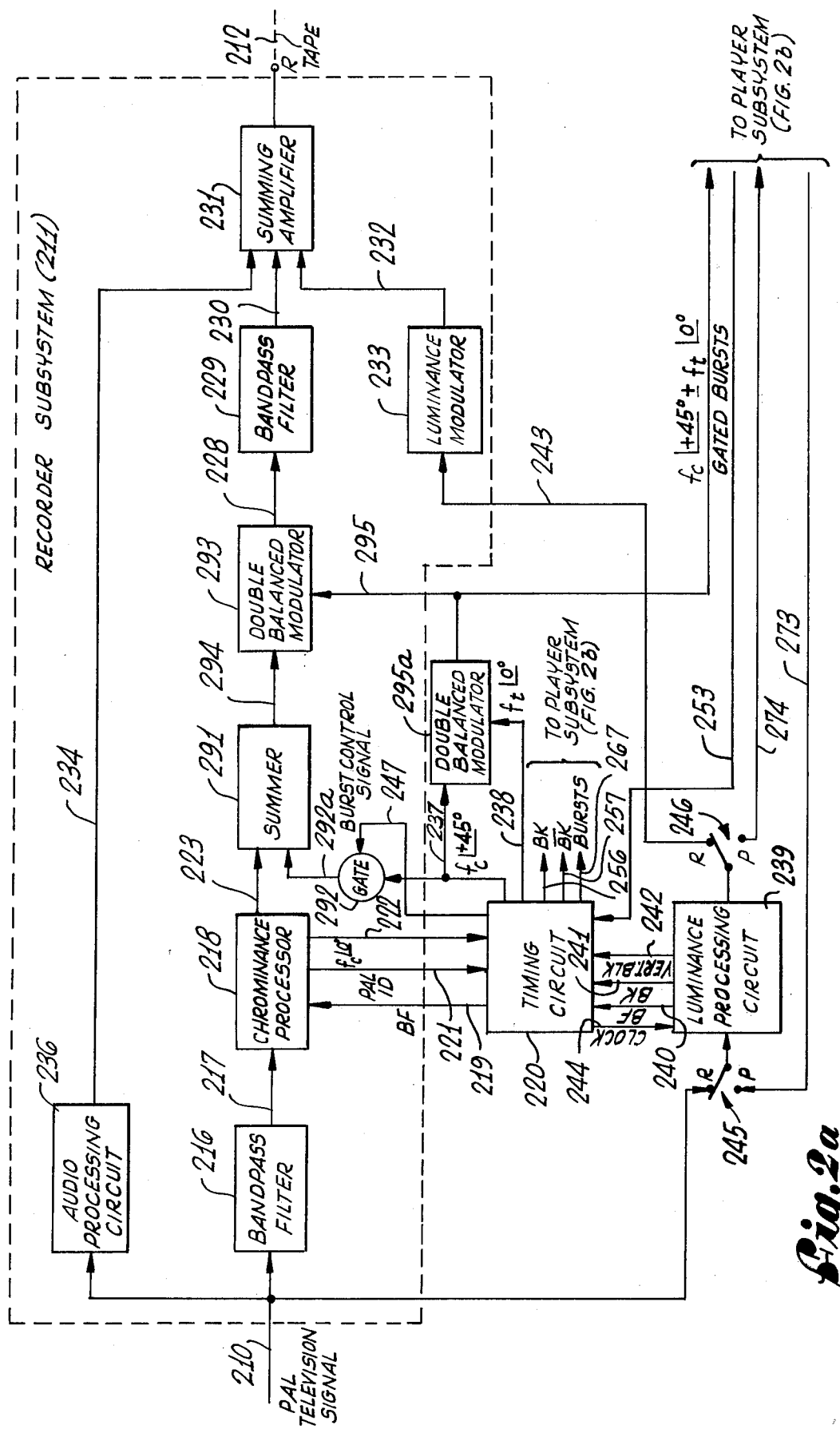
FIG. 2a is a simplified block diagram similar to FIG. 1a, but showing an alternative embodiment of the recorder subsystem of the invention, for converting a PAL-format television signal to the transfer channel format for recording on a magnetic tape.
Figure 2B:
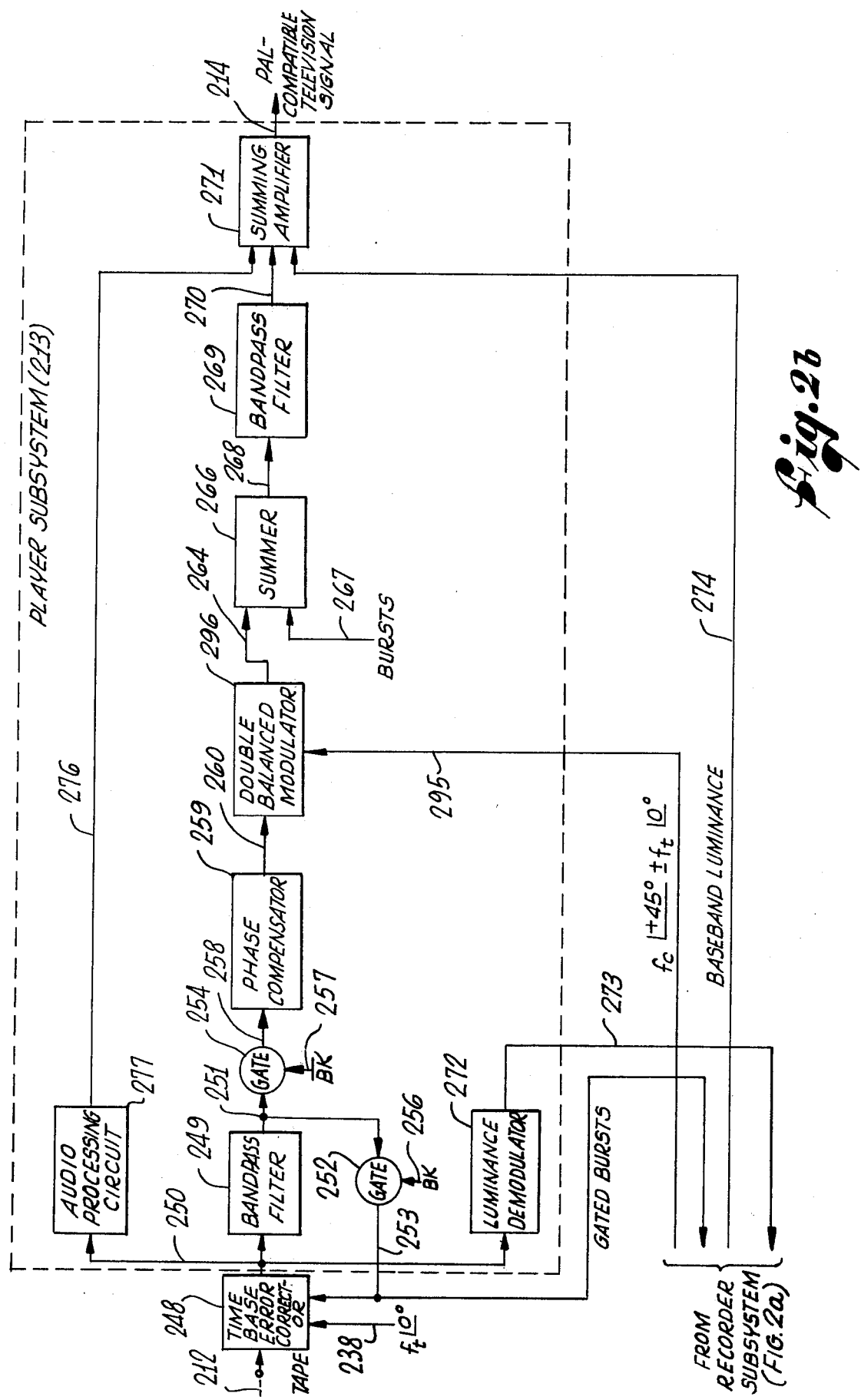
FIG. 2b is a simplified block diagram of a player subsystem operable in combination with the apparatus of FIG. 2a to convert the encoded signal recovered from the tape into the special output format for conventional reception, processing and decoding by a PAL-type television receiver.

Referring now to FIGS. 2a and 2b, there is shown an alternative embodiment of the present invention, having a recorder subsystem 211 (FIG. 2a) for converting a PAL-format color television signal to the transfer channel format for placement on a magnetic tape 212, and a player subsystem 213 (FIG. 2b) for converting the signal recovered from the tape to the special PAL-compatible output format suitable for modulation of a carrier and reception and decoding by a conventional PAL-type television receiver.

It should be noted that the two least significant digits in each reference numeral used to identify an element of the apparatus in FIGS. 2a and 2b are the same as the two least significant digits used to identify the corresponding element in FIGS. 1a and 1b. The same is true for the reference numerals used to identify corresponding elements in FIGS. 3 and 4. Further, the most significant digit in each reference numeral corresponds to the number of the figure in which it is located.

The recorder subsystem 211 of the embodiment of FIG. 2a is substantially similar to the recorder subsystem 111 of the embodiment of FIG. 1a. The PAL-format color television signal is received on line 210 and the quadrature modulated chrominance subcarrier is separated from the luminance and audio signals by a bandpass filter 216. In turn, the separated chrominance subcarrier is processed by a chrominance processor 218 to derive a PAL identification signal (PAL ID) and a chrominance phase reference $f_c \angle 0°$ for transmission to a timing circuit 220.

Chrominance bursts occurring for the duration of all but a selected few of the successive horizontal blanking intervals are inserted by a different technique from that used in the FIG. 1a embodiment. The bursts are combined with the processed quadrature modulated chrominance subcarrier in a summer 291, which follows the chrominance processor 218. As was the case with the extended duration bursts inserted in the embodiment of FIGS. 1a and 1b, these bursts facilitate the detection and correction of time base errors introduced by the steps of recording and playing back the television signal on the recording tape. The chrominance bursts supplied to the summer 291 are produced by a gate 292, which switches a reference signal $f_c \angle +45°$ in accordance with a burst control signal, such signals being supplied on lines 237 and 247, respectively, from the timing circuit 220. The summer 291 receives the chrominance bursts on line 292a from the gate 292 and receives the processed chrominance subcarrier on line 223 from the chrominance processor 218.

The quadrature modulated chrominance subcarrier, with the extended duration chrominance bursts, is then converted to the modulated transfer channel subcarrier in a double balanced modulator 293, filtered in a bandpass filter 229 to remove undesired modulation components, and, in turn, combined in a summing amplifier 231 with frequency modulated luminance and audio subcarriers. These latter subcarriers are received on lines 232 and 234 from a luminance modulator 233 and an audio processing circuit 236, respectively. This produces a composite television signal, in the transfer channel format, for recording on the magnetic tape 212.

The primary difference between the embodiments of FIG. 1a and FIG. 2a lies in the technique for converting the quadrature modulated chrominance subcarrier of frequency $f_c$ to the modulated transfer channel subcarrier of frequency $f_t$. In the embodiment of FIG. 2a, the intermediate step of reducing the quadrature modulated subcarrier to baseband is omitted, and, instead, that subcarrier is converted directly to the modulated transfer channel subcarrier.

The direct subcarrier conversion is accomplished in the double balanced modulator 293, by applying to one of its input ports the quadrature modulated subcarrier supplied on line 294 from the summer 291, and applying to a second of its input ports a special reference signal supplied on line 295, such special reference signal including components having frequencies that are the sum and difference of $f_c$ and $f_t$, and being denoted $f_c \angle +45° f_t \angle 0°$. The special reference signal is derived by mixing the reference signal $f_c \angle +45°$ with another reference signal, $f_t \angle 0°$, in a second double balanced modulator 295a. The references $f_c \angle +45°$ and $f_t \angle 0°$ are both produced by the timing unit 220 and are applied to the first and second input ports of the modulator 295a via line 237 and 238, respectively.

As is the case in the embodiment of FIGS. 1a and 1b, the frequency of the signal $f_t$ 110 0° is selected to be an odd multiple of one-fourth the horizontal line rate, thereby reducing visible interference in the reproduced video picture due to cross-modulation of the chrominance subcarrier and the frequency modulated luminance subcarrier. Alternatively, the frequency $f_t$ can be selected to be an odd multiple of one-half the horizontal line rate, and the phase angle reversed in polarity on alternate pairs of horizontal lines.

The double balanced modulator 293 produces an output signal having components with frequencies that are both the sum and difference of the frequenciess of the respective input signals. One such component is a transfer channel chrominance subcarrier $f_t \angle 0°$ which has a frequency $f_t$ and which is modulated, alternately, by U+V for one line and U−V for the next. This is the only component of the output signal that is transmitted by the 270°. bandpass filter 229. The transfer channel subcarrier is identical in format to the transfer channel chrominance subcarrier produced in the embodiment of FIG. 1a.

Likewise, the player subsystem 213 of FIG. 2b is substantially similar to the player subsystem 113 of FIG. 1b. The television signal recovered from the recording tape 212 is processed by a time base error corrector 248 and, in turn, transmitted to a bandpass filter 249, for separating the chrominance subcarrier from the luminance and audio subcarriers. The separated chrominance subcarrier is then transmitted to a gate 254 for deleting the extended duration chrominance bursts, and, in turn, to a phase compensator 259 to correct for phase errors introduced both by the bandpass filter 249 in the player subsystem 213 (FIG. 2a) and by the bandpass filter 229 in the recorder subsystem 211 (FIG. 2b).

The phase corrected chrominance subcarrier is then converted by a double balanced modulator 296 and a summer 266 to the special PAL-compatible format, filtered in a bandpass filter 269 to remove undesired modulation components and, in turn, combined in a summing amplifier 271 with a baseband luminance signal supplied from a luminance processing circuit 239 and an audio subcarrier supplied from an audio processing circuit 277. This produces the color television output signal in the special format suitable for reception and decoding by a conventional PAL-type receiver.

The primary difference between the player subsystems of FIGS. 1b and 2b lies in the techniques for converting the phase corrected chrominance subcarriers to the special PAL-compatible format. In the embodiment of FIG. 2b, the intermediate step of reducing the subcarrier to baseband is omitted, and, instead, the modulated chrominance subcarrier (at frequency $f_t$) supplied by the phase compensator 259 is converted directly to the special format subcarrier (at frequency $f_c$).

In similar fashion to the direct subcarrier conversion in the recorder subsystem 211 of FIG. 2a, the direct conversion in the player subsystem 213 of FIG. 2b is accomplished in the double balanced modulator 296, which mixes the modulated subcarrier with the special reference signal $f_c \angle +45° \pm f_t \angle 0°$. In particular, the subcarrier supplied on line 260 from the phase compensator 259 is connected to one input port of the modulator 296, and the special reference signal supplied on line 295 from the modulator 295a (FIG. 2a) is connected to a second input port. The subcarrier output of the modulator 296 is then transmitted over line 264 to the summer 266, which combines it with PAL-compatible chrominance bursts (+135° and −135°) supplied on line 267 from the timing circuit 220 (FIG. 2a).

Thus, the player subsystem 213 of FIG. 2b, like its counterpart in FIG. 1b, produces a special PAL-compatible format television signal output having a chrominance subcarrier that is substantially different from the conventional PAL-format chrominance subcarrier. Nevertheless, the special format signal can be properly decoded by a conventional PAL-type television receiver as though the signal were in a conventional PAL format, and, moreover, the signal can be produced without the need for a costly delay line.

It will be appreciated that the transfer channel format of the composite television signal produced by the recorder subsystem 211 of FIG. 2a is identical to that produced by the recorder subsystem 111 of FIG. 1a. It follows, then, that the recorder of FIG. 2a can be used in combination with the player of FIG. 1b. Likewise, the recorder of FIG. 1a can be used in combination with the player of FIG. 2b; however, a minor modification must be made to the timing circuit 120 to produce the reference signal $f_c \angle +45° \pm f_t \angle 0°$, for use by the modulator 296 of FIG. 2b.

Referring now to FIG. 3, there is shown another embodiment of the present invention, this one for converting an NTSC-format color television signal to the transfer channel format for placement on a magnetic tape 312. The signal produced is identical in format to those produced by the recorder subsystems of both FIG. 1a and FIG. 2a, and can, therefore, be used in combination with the player subsystems of either FIG. 1b or FIG. 2b, to produce the PAL-compatible format television output signal.

The embodiment of FIG. 3 is very similar to the embodiment of FIG. 1a, which processes PAL-format television signals. The NTSC-format television signal input is supplied to a recorder subsystem 311, where the quadrature modulated chrominance subcarrier is separated from the baseband luma and audio subcarrier signals by a bandpass filter 316, and, in turn, transmitted to a chrominance processor 318, which processes it in a conventional manner and produces a chrominance phase reference $f_c \angle 0°$ for transmission to a timing circuit 320. The processed chrominance subcarrier is then mixed with a reference signal $f_c \angle +45°, -45°$ in a first double balanced modulator 324, to produce a baseband chrominance signal identical in format to that produced in the embodiment of FIG. 1a, i.e., the signal comprises an alternating sequence proportional of U+V and U−V.

The baseband signal produced by the first modulator 324 is mixed with a transfer channel subcarrier $f_t \angle 0°$ in a second double balanced modulator 327 to produce a line sequential modulated subcarrier. In turn, the subcarrier produced by the modulator 327 is filtered by a bandpass filter 329 and combined in a summing amplifier 331 with frequency modulated luminance and audio subcarriers, to produce the composite television signal output for recording on the magnetic tape 312.

Besides minor differences due to differences in the precise frequencies of the chrominance and audio subcarriers of the respective NTSC and PAL television signal inputs, the only substantial difference between the embodiments of FIG. 1a and FIG. 3 is that in the latter, the phase of the reference signal $f_c \angle +45°, -45°$ applied to the first double balanced modulator 324 is switched on alternate horizontal lines between angles of +45° and −45°, relative to the phase reference $f_c \angle 0°$ derived by the chrominance processor 318.

It will be recalled that the NTSC quadrature chrominance subcarrier includes one component at a phase angle of +33° modulated by the color difference signal Q (i.e., 0.41(B-Y)+0.48(R-Y), and a quadrature component at a phase angle of +123° modulated by the color difference signal I (i.e., −0.27(B-Y)+0.74(R-Y). On those lines when the reference signal $f_c \angle +45°, -45°$ is at +45°, the phase difference between the reference and the modulated Q component is 12°, and the phase difference between the reference and the modulated I component is 78°. On those lines, then, the output of the first double balanced modulator 324 is as follows:

$= [0.41(B-Y) + 0.48(R-Y)] \cos 12° + [0.27(B-Y) + 0.74(R-Y)] \cos 78°$ $\cong 0.40(B-Y) + 0.47(R-Y) - 0.05(B-Y) + 0.15(R-Y)$ $\cong 0.35(B-Y) + 0.62(R-Y)$ $\cong 0.71U + 0.71V$ On the other hand, on those alternate lines when the reference signal $f_c\angle +45°, -45°$ is at $-45°$, the phase difference between the reference and the modulated Q component is 78°, and between the reference and the modulated I component is 168°. On those lines, then, the output of the first double balanced modulator 324 is as follows:

$= [0.41(B-Y) + 0.48(R-Y)] \cos 78° + [-0.27(B-Y) + 0.74(R-Y)] \cos 168°$ $\cong 0.09(B-Y) + 0.10(R-Y) + 0.26(B-Y) - 0.72(R-Y)$ $\cong 0.35(B-Y) - 0.62(R-Y)$ $\cong 0.71U - 0.71V$ The switched phase reference signal $f_c\angle 45°, -45°$ is supplied to the modulator 324 on line 397 from a switch 397a, which alternately selects between a reference signal $f_c\angle +45°$ supplied on line 337 from the timing circuit 320, and a reference signal $f_c\angle -45°$ supplied on line 398 from a delay mechanism 398a that operates to delay the $f_c\angle +45°$ reference by 90°. The switch is controlled by a signal $\frac{1}{2}f_H$, which is supplied on line 399 from the timing circuit 320 and which is a square wave having a frequency of one-half the horizontal line rate.

In summary, then, the recorder subsystem 311 of FIG. 3 produces a composite television signal, in the transfer channel format, for recording on the magnetic tape 312. The signal is identical in format to those produced by the recorder subsystems of FIGS. 1a and 2a, and, thus, can be readily converted to the special PAL-compatible format by the player subsystems of either FIG. 1b or FIG. 2b. For compatibility, however, a minor modification must be made to the timing circuit 320 to provide a proper reference signal $f_c\angle +45° \pm f_t\angle 0°$, required by the player subsystem of FIG. 2b.

Figure 4:
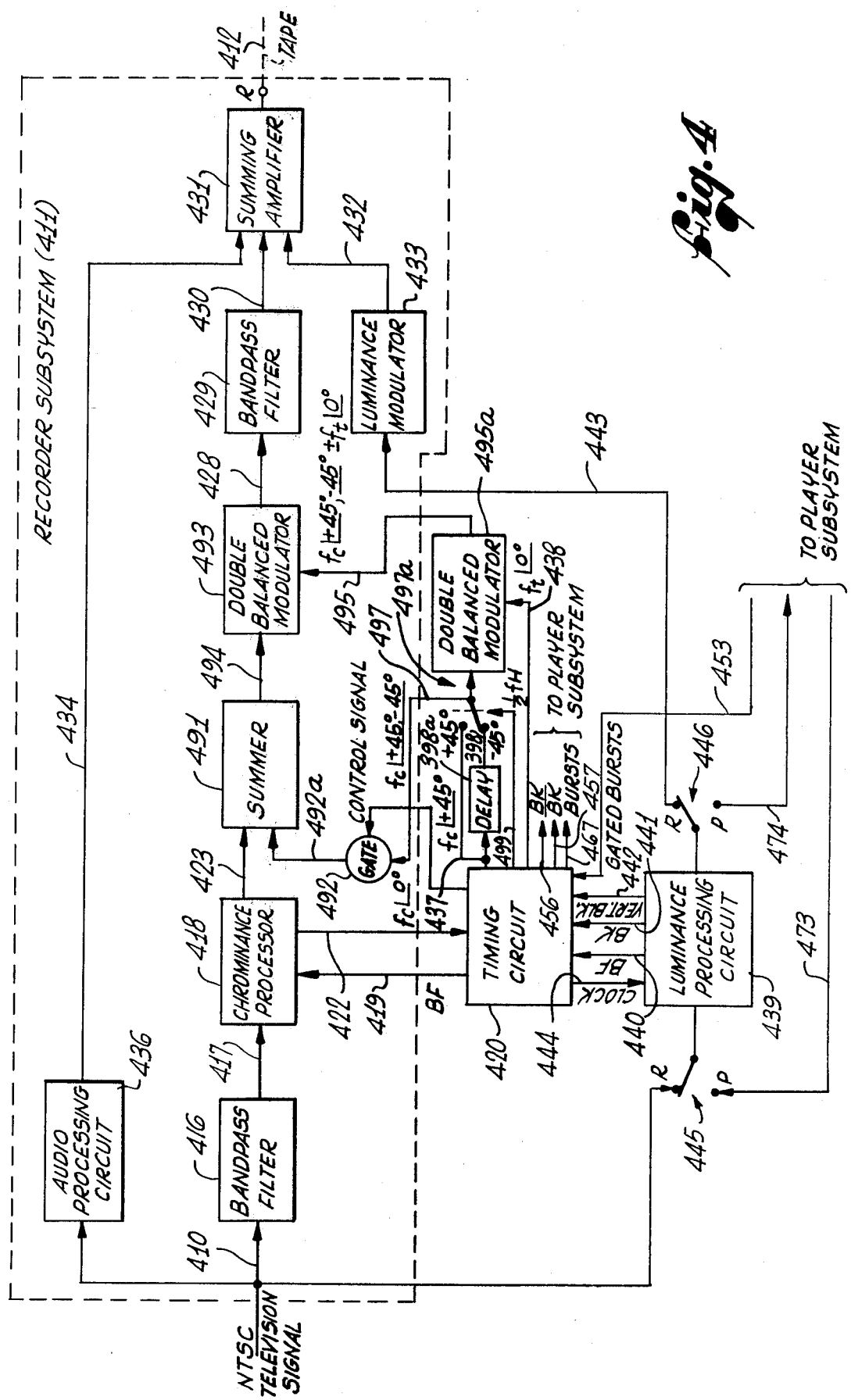
FIG. 4 is a simplified block diagram of still another alternative embodiment of the recorder subsystem of the invention, also for encoding an NTSC-format television signal into a transfer channel format for recording on a magnetic tape.

Referring now to FIG. 4, there is shown still another embodiment of the present invention, this one also for converting an NTSC-format color television signal to the transfer channel format for placement on a magnetic tape 412. This output signal format is identical to that produced by the recorder subsystems of each of FIGS. 1a, 2a and 3.

The embodiment of FIG. 4 is very similar to the embodiment of FIG. 2a, which processes PAL-format television signals. The NTSC-format television signal input is supplied to a recorder subsystem 411, where the quadrature modulated chrominance subcarrier is separated from the baseband luminance and audio subcarrier signals by a bandpass filter 416, and, in turn, transmitted to a chrominance processor 418, which processes it in a conventional manner and produces a chrominance phase reference $f_c\angle 0°$ for transmission to a timing circuit 420. The processed chrominance subcarrier is then combined with extended duration chrominance bursts in a summer 491, and the resultant signal is then transmitted to a double balanced modulator 493, which mixes it with a reference signal $f_c\angle +45°, -45° \pm f_t\angle 0°$ to produce a modulated transfer channel chrominance subcarrier. This resultant subcarrier signal is identical in format to the transfer channel subcarriers produced by the recorder subsystems of each of FIGS. 1a, 2a and 3. The subcarrier is then filtered in a bandpass filter 429 and combined in a summing amplifier 431 with frequency modulated luminance and audio subcarriers.

Besides minor differences due to differences in the precise frequencies of the chroma and audio subcarriers of the respective NTSC and PAL television signal inputs, the only substantial difference between the embodiments of FIG. 2a and FIG. 4 lies in the generation of the reference signal supplied to the double balanced modulator 493, which converts the quadrature modulated subcarrier to the transfer channel subcarrier. In the embodiment of FIG. 4, the reference signal is derived by mixing a first reference $f_t\angle 0°$ which has a frequency $f_t$ and a fixed phase angle of 0°, and a second reference $f_c\angle \pm 45°, -45°$, which has a frequency $f_c$ and a phase that is switched for alternate lines between angles of +45° and -45°.

The mixing is achieved in a second double balanced modulator 495a, to which is applied a reference $f_t\angle 0°$, 180° transmitted on line 438 from the timing circuit 420, and a reference $f_c\angle +45°, -45°$ transmitted on line 497 from a switch 497a. The switch produces the reference $f_c\angle +45°, -45°$ by alternately selecting between a reference $f_c\angle +45°$ supplied on line 437 from the timing circuit 420 and a reference $f_c\angle -45°$ supplied on line 498 from a delay mechanism 498a, which operates to delay the reference $f_c\angle +45°$ by 90°. The switch is controlled by a signal $\frac{1}{2} f_H$ supplied on line 499 from the timing circuit.

In summary, then, the recorder subsystem of FIG. 4 produces a composite television signal in the transfer channel format for recording on the magnetic tape 412. The signal is identical in format to those produced by the recorder subsystems of FIGS. 1a, 2a and 3, and, thus, can be readily converted to the special PAL-compatible format by the player subsystems of either FIG. 1b or FIG. 2b. For compatibility, however, a minor modification must be made to the timing circuit 420 to provide a proper reference signal $f_c\angle +45° \pm f_t\angle 0°$, required by the player subsystem 213 of FIG. 2b.

From the foregoing description, it should be apparent that the present invention provides an effective technique for converting both PAL-format and NTSC-format color television signals to a transfer channel format for placement on a transfer channel, and, in turn, for converting the signal recovered from the channel to a special PAL-compatible output format. This special format output can then be used to modulate a carrier for ultimate reception and decoding by a conventional PAL-type television receiver as though it were in a conventional PAL format, and, moreover, can be produced in a straightforward manner without the need for a relatively expensive delay line mechanism.

Although the invention has been described in detail with reference to its presently preferred embodiments, it will be understood by those of ordinary skill in the art that various modifications can be made without departing from the spirit and scope of the invention. Accordingly, it is not intended that the invention be limited, except as by the appended claims.

I claim:

1. A method of processing a quadrature chrominance subcarrier of a color television signal, said subcarrier having a frequency $f_c$ and having one component amplitude modulated by a first color difference signal, and a quadrature component amplitude modulated by a second color difference signal, said method comprising:
  converting the quadrature chrominance subcarrier to a special output chrominance subcarrier having a frequency compatible with a conventional Phase Alternation Line-type color television receiver and having a fixed phase angle X selected to be any angle between 0° and 360°, other than 0°, 90°, 180° or 270°, wherein the special output subcarrier is amplitude modulated on alternate horizontal scan lines by K[U sin (X)+V cos (X)] and K[U sin (X)−V cos (X)], wherein K is +1 when the angle X is selected to be between 0° and 90° or 180° and 270°, and −1 when the angle X is selected to be between 90° and 180° or 270° and 360°, and wherein U and V are both standard color difference signals derived from said first and second color difference signals, whereby the special output subcarrier can be produced without a delay line mechanism, and can be readily decoded by a conventional Phase Alternation Line-type color television receiver, to derive the two standard color difference signals, U and V.

2. A method as defined in claim 1, wherein said step of converting includes the steps of:
  converting the quadrature chrominance subcarrier to a modulated transfer channel chrominance subcarrier for placement on a transfer channel, the transfer channel chrominance subcarrier being modulated on alternate horizontal scan lines by U sin (X)+V cos (X) and U sin (X)−V cos (X); and
  converting the modulated transfer channel chrominance subcarrier recovered from the transfer channel to the special output chrominance subcarrier.

3. A method as defined in claim 1, wherein the color television signal is in a Phase Alternation Line format, and wherein said step of converting includes the steps of:
  mixing the quadrature chrominance subcarrier with a first reference signal having a frequency $f_c$ and a phase angle fixed at K(90°−X), thereby producing a baseband chrominance signal that alternates on successive horizontal scan lines between K[U sin (X)+V cos (X)] and K[U sin (X)−V cos (X)]; and
  amplitude modulating a second reference signal with the baseband chrominance signal to produce the special output chrominance subcarrier, the second reference signal having a frequency $f_c$ and a fixed phase angle X.

4. A method as defined in claim 3, wherein said step of converting further includes the intermediate steps of:
  modulating a third reference signal, of frequency $f_t$, with the baseband chrominance signal, to produce a modulated transfer channel subcarrier for placement on a transfer channel; and
  demodulating the modulated transfer channel subcarrier recovered from the transfer channel to re-create the baseband chrominance signal.

5. A method as defined in claim 1, wherein the color television signal is in a Phase Alternation Line-format, and wherein said step of converting the quadrature chrominance subcarrier includes the steps of:
  mixing a first reference signal having a frequency $f_c$ and a phase angle K(90°−X), with a second reference signal having a frequency $f_t$, thereby producing a third reference signal, which includes components having frequencies that are the sum and difference of $f_c$ and $f_t$;
  mixing the quadrature modulated subcarrier with the third reference signal to produce a transfer channel chrominance subcarrier of frequency $f_t$ for placement on a transfer channel, wherein the transfer channel subcarrier is amplitude modulated on alternate horizontal scan lines by U sin (X)+V cos (X) and U sin (X)−V cos (X);
  mixing a fourth reference signal having a frequency $f_c$ and a phase angle X, with a fifth reference signal having a frequency $f_t$ and a phase angle aligned with that of the transfer channel chrominance subcarrier recovered from the transfer channel, thereby producing a sixth reference signal, which includes components having frequencies that are the sum and difference of $f_c$ and $f_t$; and
  mixing the transfer channel chrominance subcarrier recovered from the transfer channel with the sixth reference signal to produce the special output chrominance subcarrier.

6. A method as defined in claim 1, wherein the color television signal is in a National Television Systems Committee-format, and wherein said step of converting includes the steps of:
  mixing the quadrature chrominance subcarrier with a reference signal having a frequency $f_c$ and a phase angle that is switched on alternate horizontal scan lines between +K(90°−X) and −K(90°−X) thereby producing a baseband chrominance signal that alternates on successive horizontal scan lines between K[U sin (X)+V cos (X)] and K[U sin (X)−V cos (X)]; and
  amplitude modulating a second reference signal with the baseband chrominance signal, to produce said special output chrominance subcarrier.

7. A method as defined in claim 1, wherein the color television signal is in a National Television Systems Committee-format, and wherein said step of converting includes the steps of:
  mixing the quadrature chrominance subcarrier with a reference signal having a frequency $f_c$ and a phase angle that is switched on alternate horizontal scan lines between +K(90°−X) and −K(90°−X), thereby producing a baseband chrominance signal that alternates on successive horizontal scan lines between K[U sin (X)+V cos (X)] and K[U sin (X)−V cos (X)];
  modulating the baseband chrominance signal to produce a modulated transfer channel chrominance subcarrier for placement on a transfer channel; and
  converting the modulated transfer channel chrominance subcarrier recovered from the transfer channel to the special output chrominance subcarrier.

8. A method as defined in claim 1, wherein the color television signal is in a National Television Systems Committee format, and wherein said step of converting the quadrature chrominance subcarrier includes the steps of:
  mixing a first reference signal having a frequency $f_c$ and a phase angle that is successively switched between +K(90°−X) and −K(90°−X) for alternate horizontal scan lines, with a second reference signal having a frequency $f_t$, thereby producing a third reference signal, which includes components having frequencies that are the sum and difference of $f_c$ and $f_t$;
  mixing the quadrature modulated subcarrier with the third reference signal to produce a transfer channel chrominance subcarrier of frequency $f_t$ for placement on a transfer channel, the transfer channel subcarrier being amplitude modulated on alternate horizontal scan lines by U sin (X)+V cos (X) and U sin (X)−V cos (X); and converting the modulated transfer channel to the special output chrominance subcarrier.

9. A method as defined in claim 1, wherein the fixed phase angle X is selected to be an odd multiple of +45°, whereby the special output chrominance subcarrier is amplitude modulated on alternate horizontal scan lines by a signal proportional to (U+V) and (U−V).

10. Apparatus for processing the quadrature chrominance subcarrier of a Phase Alternation Line format color television signal, to produce a special output chrominance subcarrier that can be readily decoded by a conventional Phase Alternation Line-type color television receiver to derive the two color difference signals, U and V, said special output subcarrier having a frequency $f_c$, the same as that of the quadrature chrominance subcarrier, and a phase angle fixed at X, and being amplitude modulated on alternate horizontal scan lines by K[U sin (X)+V cos (X)] and K[U sin (X)−V cos (X)], wherein K is +1 when said angle X is selected to be between 0° and 90° or 180° and 270°, and −1 when said angle X is selected to be between 90° and 180° or 270° and 360°, said apparatus comprising:

means for mixing the quadrature chrominance subcarrier with a first reference signal having a frequency $f_c$ and a fixed phase angle K(90°−X), wherein X is selected to be any angle between 0° and 360°, other than 0°, 90°, 180° or 270°, thereby producing a baseband chrominance signal that alternates on successive horizontal scan lines between K[U sin (X)+V cos (X)] and K[U sin (X)−V cos (X)];

means for modulating a second reference signal of frequency $f_t$ with the baseband chrominance signal, to produce a modulated transfer channel chrominance subcarrier for placement on a transfer channel;

means for demodulating the modulated transfer channel chrominance subcarrier recovered from the transfer channel to re-create the baseband chrominance signal; and means for amplitude modulating a third reference signal having a frequency $f_c$ and a phase angle X, with the re-created baseband chrominance signal, to produce the special output chrominance subcarrier.

11. Apparatus as defined in claim 10, further including means for detecting chrominance bursts in the horizontal blanking interval portions of the quadrature chrominance subcarrier, to derive the first reference signal.

12. Apparatus as defined in claim 10, wherein said means for modulating the second reference signal includes an amplitude modulator.

13. Apparatus as defined in claim 12, wherein:

the transfer channel chrominance subcarrier is in an amplitude modulation format;

said means for modulating the second reference signal further includes means for producing chrominance bursts in the horizontal blanking interval portion of the modulated transfer channel chrominance subcarrier, said bursts having a frequency $f_t$ and occurring for substantially the duration of the blanking intervals; and said means for demodulating the modulated transfer channel chrominance subcarrier includes means for detecting the chrominance bursts in the modulated transfer channel chrominance subcarrier recovered from the transfer channel, means for aligning the phase angle of the detected chrominance bursts with respect to the phase angle of the second reference signal, and means for mixing the modulated transfer channel chrominance subcarrier recovered from the transfer channel with the second reference signal to produce the baseband chrominance signal.

14. Apparatus as defined in claim 13, wherein:

said means for modulating the second reference signal further includes a double balanced modulator; and said means for producing chrominance bursts includes means for unbalancing said double balanced modulator during the horizontal blanking intervals, whereby said double balanced modulator produces chrominance bursts during such intervals, and bursts having a frequency and phase angle corresponding to that of the second reference signal.

15. Apparatus as defined in claim 13, wherein said chrominance bursts are absent from selected horizontal blanking intervals, thereby indicating which of the successive horizontal lines contain a chrominance signal proportional to K[U sin (X)+V cos (X)] and which contain a chrominance signal proportional to K[U sin (X)−V cos (X)].

16. Apparatus as defined in claim 10, further including:

means for combining the modulated transfer channel chrominance subcarrier produced by said means for modulating the second reference signal, with luminance and audio subcarrier signals, to produce a composite color television signal for placement on the transfer channel; and means for separating the modulated transfer channel chrominance subcarrier from the remainder of the composite color television signal recovered from the transfer channel, for transmission to said means for demodulating the transfer channel subcarrier.

17. Apparatus as defined in claim 16, wherein the frequency $f_t$ of the second reference signal is an odd multiple of one half the horizontal line rate of the quadrature chrominance subcarrier, and wherein the phase angle of the second reference signal is reversed in polarity for adjacent pairs of the successive horizontal scan lines, thereby reducing the visibility of interference due to cross-modulation of the chrominance and luminance subcarriers.

18. Apparatus as defined in claim 16, wherein the frequency $f_t$ of the second reference signal is an odd multiple of one fourth the horizontal line rate of the quadrature chrominance subcarrier, thereby reducing the visibility of interference due to cross-modulation of the chrominance and luminance subcarriers.

19. Apparatus as defined in claim 10, wherein said means for amplitude modulating the third reference signal includes means for producing appropriate Phase Alternation Line format chrominance bursts in the successive horizontal blanking interval portions of the special output chrominance subcarrier.

20. Apparatus as defined in claim 10, wherein the fixed phase angle X is selected to be an odd multiple of +45°, whereby the special output chrominance subcarrier is amplitude modulated on alternate horizontal scan lines by a signal proportional to (U+V) and (U−V).

21. Apparatus for processing the quadrature chrominance subcarrier of a Phase Alternation Line format color television signal, to produce a special output chrominance subcarrier that can be readily decoded by a conventional Phase Alternation Line-type color television receiver to derive standard color difference signals, U and V, said special output chrominance subcarrier having a frequency $f_c$, the same as that of said quadrature chrominance subcarrier, and a phase angle fixed at X, and being amplitude modulated on alternate horizontal scan lines by K[U sin (X)+V cos (X)] and K[U sin (X)−V cos (X)], wherein K is +1 when said angle X is selected to be between 0° and 90° or 180° and 270°, and −1 when said angle X is selected to be between 90° and 180° or 270° and 360°, said apparatus comprising:
 first means for converting the quadrature chrominance subcarrier to a modulated transfer channel subcarrier for placement on a transfer channel, said transfer channel subcarrier having a frequency $f_t$ and being amplitude modulated on alternate horizontal scan lines by U cos (90°−X°)+V cos (X) and U sin (X)−V cos (X), said first converting means including
 means for mixing a first reference signal having a frequency $f_c$ and a phase angle K(90°−X), with a second reference signal having a frequency $f_t$, thereby producing a third reference signal, which includes components having frequencies that are the sum and difference of $f_c$ and $f_t$, and
 means for mixing the quadrature chrominance subcarrier with the third reference signal, to produce the transfer channel chrominance subcarrier; and
 second means for converting the modulated transfer channel subcarrier recovered from the transfer channel to the special output chrominance subcarrier, said second converting means including
 means for mixing a fourth reference signal having a frequency $f_c$ and a phase angle X, with a fifth reference signal having a frequency $f_t$ and a phase angle aligned with that of the transfer channel chrominance subcarrier recovered from the transfer channel, thereby producing a sixth reference signal which includes components having frequencies that are the sum and difference of $f_c$ and $f_t$; and
 means for mixing the transfer channel chrominance subcarrier recovered from the transfer channel with the sixth reference signal, to produce the special output chrominance subcarrier.

22. Apparatus as defined in claim 21, wherein said first converting means further includes means for detecting the chrominance bursts in the horizontal blanking interval portions of the quadrature chrominance subcarrier, to derive the first reference signal.

23. Apparatus as defined in claim 21, wherein:
 said first converting means further includes means for producing chrominance bursts in the horizontal blanking interval segments of the modulated transfer channel chrominance subcarrier,
 said bursts having a frequency $f_t$ and occurring for substantially the duration of the blanking intervals, and
 said second converting means further includes
 means for detecting the chrominance bursts in the modulated transfer channel chrominance subcarrier recovered from the transfer channel, and
 means for aligning the phase angle of the detected chrominance bursts with respect to the phase angle of the fifth reference signal.

24. Apparatus as defined in claim 23, wherein said means for producing chrominance bursts includes summing means for inserting chrominance bursts of frequency $f_c$ and phase angle K(90°−X) into the horizontal blanking interval portions of the quadrature chrominance subcarrier supplied to the means for mixing the quadrature chrominance subcarrier.

25. Apparatus as defined in claim 23, wherein said chrominance bursts are absent from selected horizontal blanking intervals, thereby indicating which of the successive horizontal lines contain a chrominance signal proportional to K[U sin (X)+V cos (X)] and which contain a chrominance signal proportional to K[U sin (X)−V cos (X)].

26. Apparatus as defined in claim 21, further including:
 means for combining the modulated transfer channel chrominance subcarrier produced by the first converting means, with luminance and audio subcarrier signals, to produce a composite color television signal for placement on the transfer channel; and
 means for separating the modulated transfer channel chrominance subcarrier from the remainder of the composite color television signal recovered from the transfer channel, for transmission to the second converting means.

27. Apparatus as defined in claim 26, wherein the second reference signal has a frequency $f_t$ that is an odd multiple of one half the horizontal line rate of the quadrature chrominance subcarrier, and a phase angle that is reversed in polarity for adjacent pairs of the successive horizontal scan lines, thereby reducing the visibility of interference due to cross-modulation of the chrominance and luminance subcarriers.

28. Apparatus as defined in claim 26, wherein the frequency $f_t$ of the second reference signal is an odd multiple of one fourth the horizontal line rate of the quadrature chrominance subcarrier, thereby reducing the visibility of interference due to cross-modulation of the chrominance and luminance subcarriers.

29. Apparatus as defined in claim 21, wherein said second converting means further includes means for producing appropriate Phase Alternation Line-format chrominance bursts in the successive horizontal blanking interval portions of the special output chrominance subcarrier.

30. Apparatus as defined in claim 21, wherein the fixed phase angle X is selected to be an odd multiple of +45°, whereby the special output chrominance subcarrier is amplitude modulated on alternate horizontal scan lines by a signal proportional to (U+V) and (U−V).

31. Apparatus for processing the quadrature chrominance subcarrier of a National Television Systems Committee-format color television signal, to produce a special output chrominance subcarrier that can be readily decoded by a conventional Phase Alternation Line-type color television receiver to derive standard color difference signals, U and V, said special output chrominance subcarrier having a phase angle fixed at X, and being amplitude modulated on alternate horizontal scan lines by K[U sin (X)+V cos (X)] and K[U sin (X)−V cos (X)], wherein said angle X is selected to be any angle between 0° and 360°, other than 0°, 90°, 180°, or 270°, and wherein K is +1 when said angle X is selected to be between 0° and 90° or 180° and 270°, and −1 when said angle X is selected to be between 90° and 180° or 270° and 360°, said apparatus comprising:

means for mixing the quadrature chrominance subcarrier with a first reference signal having the same frequency as the quadrature subcarrier and having a phase angle switched on alternate lines between +K(90°−X) and −K(90°−X), thereby producing a baseband chrominance signal that alternates on successive horizontal scan lines between K[U sin (X)+V cos (X)] and K[U sin (X)−V cos (X)];

means for modulating a second reference signal, of frequency $f_t$, with the baseband chrominance signal, to produce a modulated transfer channel subcarrier for placement on a transfer channel; and means for converting the transfer channel subcarrier recovered from the transfer channel to the special output chrominance subcarrier.

32. Apparatus as defined in claim 31, further including means for detecting chrominance bursts in the horizontal blanking interval portions of the quadrature chrominance subcarrier, to derive the first reference signal.

33. Apparatus as defined in claim 31, wherein said means for modulating the second reference signal includes an amplitude modulator.

34. Apparatus as defined in claim 33, wherein said means for modulating the second reference signal further includes means for producing chrominance bursts in the horizontal blanking interval portions of the modulated transfer channel subcarrier, said bursts having a frequency $f_t$ and occurring for substantially the duration of the blanking intervals, and wherein said means for converting the transfer channel subcarrier includes means for detecting the chrominance bursts in the transfer channel subcarrier recovered from the transfer channel.

35. Apparatus as defined in claim 30, wherein said means for modulating the second reference signal further includes a double balanced modulator, and wherein said means for producing chrominance bursts includes means for unbalancing said double balanced modulator during the horizontal blanking intervals, whereby said double balanced modulator produces chrominance bursts during such intervals, said bursts having a frequency and phase angle corresponding to that of the second reference signal.

36. Apparatus as defined in claim 34, wherein said chrominance bursts are absent from selected horizontal blanking intervals, thereby indicating which of the successive horizontal lines contain a chrominance signal proportional to K[U sin (X)+V cos (X)] and which contain a chrominance signal proportional to K[U sin (X)−V cos (X)].

37. Apparatus as defined in claim 31, further including:

means for combining the modulated transfer channel chrominance subcarrier produced by the means for modulating the second reference signal, with luminance and audio subcarrier signals, to produce a composite color television signal for placement on the transfer channel; and means for separating the modulated transfer channel chrominance subcarrier from the remainder of the composite color television signal recovered from the transfer channel, for transmission to the means for converting the transfer channel subcarrier.

38. Apparatus as defined in claim 37, wherein the frequency $f_t$ of the second reference signal is an odd multiple of one half the horizontal line rate of the quadrature modulated subcarrier, and wherein the phase angle of the second reference signal is reversed in polarity for adjacent pairs of the successive horizontal scan lines, thereby reducing the visibility of interference due to cross-modulation of the chrominance and luminance subcarriers.

39. Apparatus as defined in claim 37, wherein the frequency $f_t$ of the second reference signal is an odd multiple of one fourth the horizontal line rate of the quadrature chrominance subcarrier, thereby reducing the visibility of interference due to cross-modulation of the chrominance and luminance subcarriers.

40. Apparatus as defined in claim 31, wherein the fixed phase angle X is selected to be an odd multiple of +45°, whereby the special output chrominance subcarrier is amplitude modulated on alternate horizontal scan lines by a signal proportional to (U+V) and (V−V).

41. Apparatus for processing the quadrature chrominance subcarrier of a National Television Systems Committee-format color television signal, to produce a special output chrominance subcarrier that can be readily decoded by a conventional Phase Alternation Line-type color television receiver to derive the two color difference signals, U and V, said quadrature chrominance subcarrier having a frequency $f_c$, and said special output chrominance subcarrier having a phase angle fixed at X, and being amplitude modulated on alternate horizontal scan lines by K[U sin (X)+V cos (X)] and K[U sin (X)−V cos (X)], wherein said angle X is selected to be any angle between 0° and 360°, other than 0°, 90°, 180°, or 270°, and wherein K is =+1 when said angle X is selected to be between 0° and 90° or 180° and 270°, and −1 when said angle X is selected to be between 90° and 180° or 270° and 360°, said apparatus comprising:

first means for converting the quadrature chrominance subcarrier to a modulated transfer channel subcarrier for placement on a transfer channel, said transfer channel subcarrier having a frequency $f_t$ and being amplitude modulated on alternate horizontal scan lines by U sin (X)+V cos (X) and U sin (X)−V cos (X), said first converting means including means for mixing a first reference signal having a frequency $f_c$ and a phase angle switched on alternate horizontal scan lines between +K(90°−X°) and −K(90°−X°), with a second reference signal having a frequency $f_t$, thereby producing a third reference signal that includes components having frequencies that are the sum and difference of $f_c$ and $f_t$, and means for mixing the quadrature chrominance subcarrier with the third reference signal to produce the transfer channel chrominance subcarrier; and second means for converting the modulated transfer channel subcarrier recovered from the transfer channel to the special output chrominance subcarrier.

42. Apparatus as defined in claim 41, wherein said first converting means further includes means for detecting chrominance bursts in the horizontal blanking interval portions of the quadrature chrominance subcarrier, to derive the first reference signal.

43. Apparatus as defined in claim 41, wherein said first converting means further includes summing means for inserting chrominance bursts, having a frequency $f_c$ and a phase angle switched on alternate horizontal scan lines between $+K(90°-X°)$ and $-K(90°-X°)$, into the horizontal blanking interval portions of the quadrature chrominance subcarrier supplied to said means for mixing the quadrature chrominance subcarrier, said bursts occurring for substantially the duration of the blanking intervals, whereby said means for mixing the quadrature chrominance subcarrier produces corresponding chrominance bursts of frequency $f_t$ during such blanking intervals.

44. Apparatus as defined in claim 43, wherein said chrominance bursts are absent from selected horizontal blanking intervals, thereby indicating which of the successive horizontal lines contain a chrominance signal proportional to $K[U \sin(X)+V \cos(X)]$ and which contain a chrominance signal proportional to $K[U \sin(X)-V \cos(X)]$.

45. Apparatus as defined in claim 41, further including:
   means for combining the modulated transfer channel chrominance subcarrier produced by said means for mixing the quadrature chrominance subcarrier, with luminance and audio subcarrier signals, to produce a composite color television signal for placement on the transfer channel; and
   means for separating the modulated transfer channel chrominance subcarrier from the remainder of the composite color television signal recovered from the transfer channel, for transmission to said second converting means.

46. Apparatus as defined in claim 45, wherein the frequency $f_t$ of the second reference signal is an odd multiple of one half the horizontal line rate of the quadrature chrominance subcarrier, and wherein the phase angle of the second reference signal is reversed in polarity for adjacent pairs of the successive horizontal scan lines, thereby reducing the visibility of interference due to cross-modulation of the chrominance and luminance subcarriers.

47. Apparatus as defined in claim 45, wherein the frequency $f_t$ of the second reference signal is an odd multiple of one fourth the horizontal line rate of the quadrature chrominance subcarrier, thereby reducing the visibility of interference due to cross-modulation of the chrominance and luminance subcarriers.

48. Apparatus as defined in claim 41, wherein the fixed phase angle X is selected to be an odd multiple of +45°, whereby the special output chrominance subcarrier is amplitude modulated on alternate horizontal scan lines by a signal proportional to $(U+V)$ and $(U-V)$.

49. Apparatus for processing a Phase Alternation Line-format color television signal, said signal including a quadrature chrominance subcarrier having a frequency $f_c$, said apparatus comprising:
   means for separating the quadrature chrominance subcarrier from the remainder of the color television signal; and
   means for converting the separated quadrature chrominance subcarrier to a special transfer channel chrominance subcarrier, which has a frequency $f_t$ and which is amplitude modulated on alternate horizontal scan lines by $U \sin(X)+V \cos(X)$ and $U \sin(X)-V \cos(X)$, wherein U and V are conventional color difference signals, and wherein X is selected to be any angle between 0° and 360°, other than 0°, 90°, 180° or 270°.

50. Apparatus as defined in claim 49, wherein said converting means includes:
   means for mixing the quadrature chrominance subcarrier with a first reference signal having a frequency $f_c$ and a phase angle fixed at $K(90°-X)$, thereby producing a baseband chrominance signal that alternates on successive horizontal scan lines between $K[U \sin(X)+V \cos(X)]$ and $K[U \sin(X)-V \cos(X)]$, and
   means for modulating a second reference signal, of frequency $f_t$, with the baseband chrominance signal, to produce the special transfer channel chrominance subcarrier.

51. Apparatus as defined in claim 50, wherein said converting means further includes means for detecting chrominance bursts in the horizontal blanking interval portions of the quadrature chrominance subcarrier, to derive the first reference signal.

52. Apparatus as defined in claim 50, wherein said means for modulating the second reference signal includes an amplitude modulator.

53. Apparatus as defined in claim 52, wherein said means for modulating the second reference signal further includes means for producing chrominance bursts in the horizontal blanking interval portions of the transfer channel chrominance subcarrier, said bursts having a frequency $f_t$ and occurring for substantially the duration of the blanking intervals.

54. Apparatus as defined in claim 53, wherein said means for modulating the second reference signal further includes a double balanced modulator, and wherein said means for producing chrominance bursts includes means for unbalancing said double balance modulator during the horizontal blanking intervals, whereby during such intervals said double balance modulator produces chrominance bursts having a frequency and phase angle corresponding to that of the second reference signal.

55. Apparatus as defined in claim 53, wherein said chrominance bursts are absent from selected horizontal blanking intervals, thereby indicating which of the successive horizontal lines contain a chrominance signal proportional to $K[U \sin(X)+V \cos(X)]$ and which contain a chrominance signal proportional to $K[U \sin(X)-V \cos(X)]$.

56. Apparatus as defined in claim 49, wherein said converting means includes:
   means for mixing a first reference signal having a frequency $f_c$ and a phase angle $K(90°-X)$, with a second reference signal having a frequency $f_t$, thereby producing a third reference signal that includes components having frequencies that are the sum and difference of $f_c$ and $f_t$, and
   means for mixing the quadrature chrominance subcarrier with the third reference signal, to produce the special transfer channel subcarrier.

57. Apparatus as defined in claim 56, wherein said converting means further includes means for detecting chrominance bursts in the horizontal blanking interval portions of the quadrature chrominance subcarrier, to derive the first reference signal.

58. Apparatus as defined in claim 56, wherein said converting means further includes means for producing chrominance bursts in the horizontal blanking interval portions of the special transfer channel subcarrier, said bursts having a frequency $f_t$ and occurring for substantially the duration of the blanking intervals.

59. Apparatus as defined in claim 58, wherein said means for producing chrominance bursts includes summing means for inserting chrominance bursts of frequency $f_c$ and phase angle $+K(90°-X)$ into the horizontal blanking interval portions of the quadrature chrominance subcarrier supplied to said means for mixing the quadrature chrominance subcarrier.

60. Apparatus as defined in claim 58, wherein said chrominance bursts are absent from selected horizontal blanking intervals, thereby indicating which of the successive horizontal lines contain a chrominance signal proportional to $K[U \sin (X)+V \cos (X)]$ and which contain a chrominance signal proportional to $K[U \sin (X)-V \cos (X)]$.

61. Apparatus as defined in claim 49, further including means for combining the special transfer channel subcarrier produced by said converting means, with luminance and audio subcarrier signals, to produce a composite color television signal.

62. Apparatus as defined in claim 61, wherein the frequency $f_t$ is an odd multiple of one half the horizontal line rate of the quadrature chrominance subcarrier, and a phase angle that is reversed in polarity for adjacent pairs of successive horizontal scan lines, thereby reducing the visibility of the interference due to cross-modulation of the chrominance and luminance subcarriers.

63. Apparatus as defined in claim 61, wherein the frequency $f_t$ of the second reference signal is an odd multiple of one fourth the horizontal line rate of the quadrature chrominance subcarrier, thereby reducing the visibility of interference due to cross-modulation of the chrominance and luminance subcarriers.

64. Apparatus as defined in claim 49, wherein the angle X is selected to be an odd multiple of $+45°$, whereby the special transfer channel subcarrier is amplitude modulated on alternate horizontal scan lines by a signal proportional to $(U+V)$ and $(U-V)$.

65. Apparatus as defined in claim 49, further including means for converting the transfer channel subcarrier to a special output chrominance subcarrier that has a frequency $f_c$ and a phase angle fixed at X, and that is amplitude modulated on alternate horizontal scan lines by $K[U \sin (X)+V \cos (X)]$ and $K[U \sin (X)-V \cos (X)]$, wherein K is $+1$ when said angle X is selected to be between 0° and 90° or 180° and 270°, and $-1$ when said angle X is selected to be between 90° and 180° or 270° and 360°, whereby said special output chrominance subcarrier can be readily decoded by a conventional Phase Alternation Line-type color television receiver.

66. Apparatus for processing a National Television Systems Committee-format color television signal, said signal including a quadrature chrominance subcarrier having a frequency $f_c$, said apparatus comprising:
means for separating the quadrature chrominance subcarrier from the remainder of the color television signal; and
means for converting the quadrature chrominance subcarrier to a special transfer channel chrominance subcarrier, which has a frequency $f_t$ and which is modulated on alternate horizontal scan lines by $U \sin (X)+V \cos (X)$ and $U \sin (X)-V \cos (X)$, wherein X is selected to be any angle between 0° and 360°, other than 0°, 90°, 180° or 270°.

67. Apparatus as defined in claim 66, wherein said converting means includes:

means for mixing the quadrature chrominance subcarrier with a first reference signal having a frequency $f_c$ and a phase angle switched on alternate lines between $+K(90°-X)$, and $-K(90°-X)$, thereby producing a baseband chrominance signal that alternated on successive horizontal scan lines between $K[U \sin (X)+V \cos (X)]$ and $K[U \sin (X)-V \cos (X)]$; and
means for modulating a second reference signal, of frequency $f_t$, with the baseband chrominance signal, to produce the special transfer channel chrominance subcarrier.

68. Apparatus as defined in claim 67, wherein said converting means further includes means for detecting chrominance bursts in the horizontal blanking interval portions of the quadrature chrominance subcarrier, to derive the first reference signal.

69. Apparatus as defined in claim 67, wherein said means for modulating the second reference signal includes an amplitude modulator.

70. Apparatus as defined in claim 69, wherein said means for modulating the second reference signal further includes means for producing chrominance bursts in the horizontal blanking interval portions of the transfer channel chrominance subcarrier said bursts having a frequency $f_t$ and occurring for substantially the duration of the blanking intervals.

71. Apparatus as defined in claim 70, wherein said means for modulating the second reference signal further includes a double balanced modulator, and wherein said means for producing chrominance bursts includes means for unbalancing said double balance modulator during the horizontal blanking intervals, whereby during such intervals said double balance modulator produces chrominance bursts having a frequency and phase angle corresponding to that of the second reference signal.

72. Apparatus as defined in claim 70, wherein said chrominance bursts are absent from selected horizontal blanking intervals, thereby indicating which of the successive horizontal lines contain a chrominance signal proportional to $K[U \sin (X)+V \cos (X)]$ and which contain a chrominance signal proportional to $K[U \sin (X)-V \cos (X)]$.

73. Apparatus as defined in claim 66, wherein said converting means includes:
means for mixing a first reference signal having a frequency $f_c$ and a phase angle switched on alternate lines between $+K(90°-X)$ and $-K(90°-X)$, with a second reference signal having a frequency $f_t$, thereby producing a third reference signal that includes components having frequencies that are the sum and difference of $f_c$ and $f_t$; and
means for mixing the quadrature chrominance subcarrier with the third reference signal, to produce the special transfer channel subcarrier.

74. Apparatus as defined in claim 73, wherein said converting means further includes means for detecting chrominance bursts in the horizontal blanking interval portions of the quadrature chrominance subcarrier, to derive the first reference signal.

75. Apparatus as defined in claim 73, wherein said converting means further includes means for producing chrominance bursts of frequency $f_t$ in the horizontal blanking interval portions of the special transfer channel subcarrier.

76. Apparatus as defined in claim 75, wherein said means for producing chrominance bursts includes summing means for inserting chrominance bursts into the horizontal blanking interval portions of the quadrature chrominance subcarrier supplied to said means for mixing the quadrature chrominance subcarrier, said bursts having a frequency $f_c$ and a phase angle switched on alternate lines between $+K(90°-X)$ and $-K(90°-X)$, and said bursts extending for substantially the duration of the blanking intervals.

77. Apparatus as defined in claim 75, wherein said chrominance bursts are absent from selected horizontal blanking intervals, thereby indicating which of the successive horizontal lines contain a chrominance signal porportional to $K[U \sin (X)+V \cos (X)]$ and which contain a chrominance signal proportional to $K[U \sin (X)-V \cos (X)]$.

78. Apparatus as defined in claim 66, further including means for combining the special transfer channel subcarrier produced by said converting means, with luminance and audio subcarrier signals, to produce a composite color television signal for placement on a transfer channel.

79. Apparatus as defined in claim 78, wherein the frequency $f_t$ is an odd multiple of one half the horizontal line rate of the quadrature chrominance subcarrier, and a phase angle that is reversed in polarity for adjacent pairs of successive horizontal scan lines, thereby reducing the visibility of interference due to cross-modulation of the chrominance and luminance subcarriers.

80. Apparatus as defined in claim 78, wherein the frequency $f_t$ of the second reference signal is an odd multiple of one fourth the horizontal line rate of the quadrature chrominance subcarrier, thereby reducing the visibility of interference due to cross-modulation of the chrominance and luminance subcarriers.

81. Apparatus as defined in claim 66, wherein the phase angle X is selected to be an odd multiple of $+45°$, whereby the special transfer channel subcarrier is amplitude modulated on alternate horizontal scan lines by a signal proportional to $(U+V)$ and $(U-V)$.

82. Apparatus as defined in claim 66, further including means for converting the transfer channel subcarrier to a special output chrominance subcarrier that has a frequency $f_c$ and a phase angle fixed at X, and that is amplitude modulated on alternate horizontal scan lines by $K[U \sin (X)+V \cos (X)]$ and $K[U \sin (X)-V \cos (X)]$, wherein K is $+1$ when said angle X is selected to be between 0° and 90° or 180° and 270°, and $-1$ when said angle X is selected to be between 90° and 180° or 270° and 360°, whereby said special output chrominance subcarrier can be readily decoded by a conventional Phase Alternation Line-type color television receiver.

83. Apparatus for processing a chrominance subcarrier of a color television signal, said chrominance subcarrier having a frequency $f_t$ and being modulated on alternate horizontal scan lines by $U \sin (X)+V \cos (X)$ and $U \sin (X)-V \cos (X)$, wherein U and V are conventional color difference signals, and wherein X is any fixed angle between 0° and 360°, other than 0°, 90°, 180° or 270°, said apparatus comprising:
 means for separating the chrominance subcarrier from the remainder of the color television signal;
 means for converting the separated chrominance subcarrier to a special output chrominance subcarrier which has a frequency $f_c$ and a fixed phase angle X and which is amplitude modulated on alternate horizontal scan lines by $K[U \sin (X)+V \cos (X)]$ and $K[U \sin (X)-V \cos (X)]$, wherein K is $+1$ when X is selected to be between 0° and 90° or 180° and 270°, and $-1$ when X is selected to be between 90° and 180° or 270° and 360°; and
 means for summing together the special output chrominance subcarrier with a baseband luminance signal and a frequency modulated audio subcarrier, to produce a special output format color television signal that can be properly decoded by a conventional Phase Alternation Line-type color television receiver as though it were in a conventional Phase Alternation Line format, said special output format signal being produced without use of a delay line mechanism.

84. Apparatus as defined in claim 83, wherein the chrominance subcarrier of the color television signal input is in an amplitude modulation format, and wherein said means for converting the separated chrominance subcarrier includes:
 means for producing a first reference signal having a frequency $f_t$ and a phase angle aligned with that of the separated chrominance subcarrier;
 means for mixing the separated chrominance subcarrier with the first reference signal, to produce a baseband chrominance signal that alternates on successive horizontal scan lines between $K[U \sin (X)+V \cos (X)]$ and $K[U \sin (X)-V \cos (X)]$;
 means for producing a second reference signal having a frequency $f_c$ and a phase angle X; and
 means for amplitude modulating the second reference signal with the baseband chrominance signal, to produce the special output chrominance subcarrier.

85. Apparatus as defined in claim 84 wherein the chrominance subcarrier of the color television signal input includes chrominance bursts occurring for substantially the duration of the horizontal blanking intervals, and wherein said means for converting the separated chrominance subcarrier further includes:
 means for detecting the chrominance bursts in the chrominance subcarrier of the color television signal input, and
 means for aligning the phase of the detected chrominance bursts with respect to the phase angle of the first reference signal.

86. Apparatus as defined in claim 84, wherein said means for amplitude modulating the second reference signal includes means for producing appropriate Phase Alternation Line-format chrominance bursts in the successive horizontal blanking interval portions of the special output chrominance subcarrier.

87. Apparatus as defined in claim 84, wherein said chrominance bursts are absent from selected horizontal blanking intervals, thereby indicating which of the successive horizontal lines contain a chrominance signal proportional to $K[U \sin (X)+V \cos (X)]$ and which contain a chrominance signal proportional to $K[U \sin (X)-V \cos (X)]$.

88. Apparatus as defined in claim 83, wherein the chrominance subcarrier of the color television signal input is in an amplitude modulation format, and wherein said means for converting the separated chrominance subcarrier includes:
 means for producing a first reference signal having a frequency $f_t$ and a phase angle aligned with that of the separated chrominance subcarrier;
 means for producing a second reference signal having a frequency $f_c$ and a phase angle X;

means for mixing the first reference signal with the second reference signal, to produce a third reference signal, which includes components have frequencies that are the sum and difference of $f_c$ and $f_t$;

means for mixing the separated chrominance subcarrier with the third reference signal, to produce the special output chrominance subcarrier.

89. Apparatus as defined in claim 88, wherein the chrominance subcarrier of the color television signal input includes chrominance bursts occurring for substantially the duration of the horizontal blanking intervals, and wherein said means for converting the separated chrominance subcarrier further includes:

means for detecting the chrominance bursts in the chrominance subcarrier of the color television signal input; and means for aligning the phase of the detected chrominance bursts with respect to the phase angle of the first reference signal.

90. Apparatus as defined in claim 88, wherein said means for converting the separated chrominance subcarrier further includes means for producing appropriate Phase Alternation Line-format chrominance bursts in the successive horizontal blanking interval segments of the special output chrominance subcarrier.

91. Apparatus as defined in claim 88, wherein said chrominance bursts are absent from selected horizontal blanking intervals, thereby indicating which of the successive horizontal lines contain a chrominance signal proportional to K[U sin (X)+V cos (X)] and which contain a chrominance signal proportional to K[U sin (X)−V cos (X)].

92. Apparatus as defined in claim 83, wherein the fixed phase angle X is selected to be an odd multiple of +45°, whereby the special output chrominance subcarrier is amplitude modulated on alternate horizontal scan lines by a signal proportional to (U+V) and (U−V).

93. Apparatus for converting a conventional Phase Alternation Line-format color television signal, which includes a baseband luminance signal, a frequency modulated audio subcarrier signal, and a quadrature chrominance subcarrier that has a frequency $f_c$ and that is amplitude modulated by color difference signals U and V, to a special transfer channel format, which includes frequency modulated audio and luminance subcarriers and a transfer channel chrominance subcarrier that has a frequency $f_t$ and that is amplitude modulated on successive horizontal scan lines, in an alternating fashion, by U+V and U−V, said apparatus comprising:

first filtering means for separating the quadrature chrominance subcarrier from the remainder of the Phase Alternation Line-format color television signal;

first generating means for detecting chrominance bursts in the horizontal blanking interval portions of the separated quadrature chrominance subcarrier, and for producing a first reference signal having a frequency $f_c$ and a phase angle fixed at an odd multiple of +45°;

first double balanced modulator means for mixing the separated quadrature chrominance subcarrier with the first reference signal, to produce a baseband chrominance signal that is, on alternate horizontal scan lines, proportional to U+V and U−V;

second generating means for producing a second reference signal, having a frequency $f_t$ and a phase that reverses polarity for adjacent pairs of successive horizontal scan lines, said frequency $f_t$ being an odd multiple of one half the horizontal line rate of the quadrature chrominance subcarrier;

second double balanced modulator means for mixing the baseband chrominance signal with the second reference signal, to produce the transfer channel chrominance subcarrier;

means for unbalancing said second double balanced modulator means for the duration of the horizontal blanking intervals, whereby said second double balanced modulator means produces chrominance bursts during such intervals, said bursts having a frequency and phase angle corresponding to that of the second reference signal and facilitating a subsequent correction of time base errors in the transfer channel-format color television signal;

second filtering means for removing undesired modulation components from the transfer channel chrominance subcarrier produced by said second double balanced modulator means;

means for separating the baseband luminance signal from the remainder of the Phase Alternation-Line format color television signal, and for converting the separated luminance signal to a frequency modulated luminance subcarrier; and means for summing together the filtered transfer channel chrominance subcarrier, the frequency modulated luminance subcarrier, and a frequency modulated audio subcarrier, to produce the special transfer channel format color television signal.

94. Apparatus for converting a color television signal in a transfer channel format, which includes frequency modulated luminance and audio subcarrier signals and a chrominance subcarrier that has a frequency $f_t$ and that is amplitude modulated on successive lines, in an alternating fashion, by U+V and U−V, wherein U and V are both color difference signals, to a special output format that can be properly decoded by a conventional Phase Alternation Line-type color television receiver, said special output format including a baseband luminance signal, a frequency modulated audio subcarrier signal, and a special output chrominance subcarrier, which has a frequency $f_c$ and a phase angle of +45° and which is amplitude modulated on successive horizontal scan lines, in an alternating fasion, by U+V and U−V, said apparatus comprising:

first filtering means for separating the transfer channel chrominance subcarrier from the remainder of the transfer channel format color television signal;

first generating means for producing a first reference signal having a frequency $f_t$ and a phase aligned with the phase of the separated transfer channel chrominance subcarrier, said first generating means including time base error correction means for variably delaying the transfer channel format color television signal to align the phase of chrominance bursts occurring during horizontal blanking interval portions of the television signal with the phase of the first reference signal;

first double balanced modulator means for mixing the separated transfer channel chrominance subcarrier with the first reference signal, to produce a baseband chrominance signal that is, on alternate horizontal scan lines, proportional to U+V and U−V.

95. Apparatus for converting a conventional Phase Alternation Line-format color television signal, which includes a baseband luminance signal, a frequency modulated audio subcarrier signal, and a quadrature chrominance subcarrier that has a frequency $f_c$ and that is amplitude modulated by color difference signals U and V, to a special transfer channel format, which includes frequency modulated audio and luminance subcarriers and a transfer channel chrominance subcarrier that has a frequency $f_t$ and that is amplitude modulated on successive horizontal scan lines, in an alternating fashion, by U+V and U−V, said apparatus comprising:

first filtering means for separating the quadrature chrominance subcarrier from the remainder of the Phase Alternation Line-format color television signal;

first generating means for detecting chrominance bursts in the horizontal blanking interval portions of the separated quadrature chrominance subcarrier and for producing a first reference signal having a frequency $f_c$ and a phase angle fixed at an odd multiple of +45°;

gating means for producing chrominance bursts extending for the duration of the horizontal blanking intervals, said bursts having a frequency and phase angle corresponding to that of the first reference signal and facilitating a subsequent correction of time base errors in the transfer channel-format color television signal;

first summing means for combining the chrominance bursts produced by said gating means with the separated quadrature chrominance subcarrier, to produce a partially processed quadrature chrominance subcarrier.

96. Apparatus for converting a color television signal in a transfer channel format, which includes frequency modulated luminance and audio subcarrier signals and a chrominance subcarrier that has a frequency $f_t$ and that is amplitude modulated on successive lines, in an alternating fashion, by U+V and U−V, wherein U and V are both color difference signals, to a special output format that can be properly decoded by a conventional Phase Alternation Line-type color television receiver, said special output format including a baseband luminance signal, a frequency modulated subcarrier signal, and a transfer channel chrominance subcarrier, which has a frequency $f_c$ and a phase angle of +45° and which is amplitude modulated on successive horizontal scan lines, in an alternating fashion, by U+V and U−V, said apparatus comprising:

first filtering means for separating the transfer channel chrominance subcarrier from the remainder of the transfer channel format color television signal;

first generating means for producing a first reference signal having a frequency $f_t$ and a phase aligned with the phase of the separated transfer channel chrominance subcarrier, said first generating means including time base error correction means for variably delaying the transfer channel format color television signal to align the phase of chrominance bursts occurring during horizontal blanking interval portions of the television signal with the phase of the first reference signal;

second generating means for producing a second reference signal, which has a frequency $f_c$ and a phase angle +45°;

means for mixing the first reference signal with the second reference signal, to produce a third reference signal, which includes components having frequencies that are the sum and difference of $f_c$ and $f_t$;

double balanced modulator means for mixing the separated transfer channel chrominance subcarrier with the third reference signal, to produce a chrominance subcarrier that has a frequency $f_c$ and that is amplitude modulated on alternate lines by U+V and U−V;

third generating means for producing conventional Phase Alternation Line-format chrominance bursts;

first summing means for summing the Phase Alternation Line-format chrominance bursts with the chrominance subcarrier produced by said double balanced modulator means, thereby producing the special output chrominance subcarrier;

second filtering means for removing undesired modulation components from the special output chrominance subcarrier produced by said first summing means;

means for separating the frequency modulated luminance subcarrier from the remainder of the transfer channel format color television signal, and for demodulating the separated luminance subcarrier to a baseband luminance signal; and second summing means for summing together the filtered special output chrominance subcarrier, the baseband luminance signal, and a frequency modulated audio subcarrier, to produce the special output format color television signal, which can be properly decoded by a conventional Phase Alternation Line-type color television receiver as though it were in a conventional Phase Alternation Line format, said special output format signal being produced without use of a delay line mechanism.

97. Apparatus for converting a conventional National Television Systems Committee-format color television signal, which includes a baseband luminance signal, a frequency modulated audio subcarrier signal, and a quadrature chrominance subcarrier that has a frequency $f_c$ and that is amplitude modulated by color difference signals I and Q, to a special transfer channel format, which includes frequency modulated audio and luminance subcarriers and a transfer channel chrominance subcarrier that has a frequency $f_t$ and that is amplitude modulated on successive horizontal scan lines, in an alternating fashion, by U+V and U−V, wherein U and V are related to I and Q by the following equations $$Q = 0.41U + 0.48V$$

$$I = -0.27U + 0.74V,$$

said apparatus comprising:

first filtering means for separating the quadrature chrominance subcarrier from the remainder of the National Television Systems Committee-format color television signal;

first generating means for detecting chrominance bursts in the horizontal blanking interval portions of the separated quadrature chrominance subcarrier and for producing a first reference signal having a frequency $f_c$ and a phase angle switched on alternate horizontal scan lines between +X° and −X, wherein X is an odd multiple of +45°, said first generating means including means first double balanced modulator means for mixing the separated quadrature chrominance subcarrier with the first reference signal, to produce a baseband chrominance signal that is, on alternate horizontal scan lines, porportional to U+V and U−V;

second generating means for producing a second reference signal, having a frequency $f_t$ and a phase that reverses polarity for adjacent pairs of successive horizontal scan lines, said frequency $f_t$ being an odd multiple of one half the horizontal line rate of the quadrature chrominance subcarrier;

second double balanced modulator means for mixing the baseband chrominance signal with the second reference signal, to produce the transfer channel chrominance subcarrier;

means for unbalancing said second double balanced modulator means for the duration of the horizontal blanking intervals, whereby said second double balanced modulator means produces chrominance bursts during such intervals, said bursts having a frequency and phase angle corresponding to that of the second reference signal and facilating a subsequent correction of time base errors in the transfer channel-format color television signal;

second filtering means for removing undesired modulation components from the transfer channel chrominance subcarrier produced by said second double balanced modulator means;

means for separating the baseband luminance signal from the remainder of the National Television Systems Committee-format color television signal, and for converting the separated luminance signal to a frequency modulated luminance subcarrier; and means for summing together the filtered transfer channel chrominance subcarrier, the frequency modulated luminance subcarrier, and a frequency modulated audio subcarrier, to produce the special transfer channel format color television signal.

98. Apparatus for converting a conventional National Television Systems Committee-format color television signal, which includes a baseband luminance signal, a frequency modulated audio subcarrier signal, and a quadrature chrominance subcarrier that has a frequency $f_c$ and that is amplitude modulated by color difference signals I and Q, to a special transfer channel format, which includes frequency modulated audio and luminance subcarriers and a transfer channel chrominance subcarrier that has a frequency $f_t$ and that is amplitude modulated on successive horizontal scan lines, in an alternating fashion, by U+V and U−V, wherein U and V are related to I and Q by the following equations $$Q = 0.41U + 0.48V$$

$$I = -0.27U + 0.74V,$$

said apparatus comprising:

first filtering means for separating the quadrature chrominance subcarrier from the remainder of the National Television Systems Committee-format color television signal;

first generating means for detecting chrominance bursts in the horizontal blanking interval portions of the separated quadrature chrominance subcarrier and for producing a first reference signal having a frequency $f_c$ and a phase angle switched on alternate horizontal scan lines between $+X$ and $-X$, wherein X is an odd multiple of 45°;

gating means for producing chrominance bursts extending for the duration of the horizontal blanking intervals, said bursts having a frequency and phase angle corresponding to that of the first reference signal and facilitating a subsequent correction of time base errors in the transfer channel-format color television signal;

first summing means for combining the chrominance bursts produced by said gating means with the separated quadrature chrominance subcarrier, to produce a partially processed quadrature chrominance subcarrier;

second generating means for producing a second reference signal having a frequency $f_t$ and a phase that reverses polarity for adjacent pairs of successive horizontal scan lines, said frequency $f_t$ being an odd multiple of one half the horizontal line rate of the quadrature chrominance subcarrier;

means for mixing the first reference signal with the second reference signal, to produce a third reference signal, which includes components having frequencies that are the sum and different of $f_c$ and $f_t$;

double balanced modulator means for mixing the partially processed quadrature chrominance subcarrier with the third reference signal, to produce the transfer channel chrominance subcarrier;

second filtering means for removing undesired modulation components from the transfer channel chrominance subcarrier produced by said double balanced modulator means;

means for separating the baseband luminance signal from the remainder of the National Television Systems Committee-format color television signal, and for converting the separated luminance signal to a frequency modulated luminance subcarrier; and means for summing together the filtered transfer channel chrominance subcarrier, the frequency modulated luminance subcarrier, and a frequency modulated audio subcarrier, to produce the special transfer channel format color television signal.

* * * * *

UNITED STATES PATENT AND TRADEMARK OFFICE
CERTIFICATE OF CORRECTION

PATENT NO. : 4,217,603

DATED : August 12, 1980

INVENTOR(S) : Bernhard A. Hjortzberg

It is certified that error appears in the above—identified patent and that said Letters Patent is hereby corrected as shown below:

Column 1, line 66, delete "the aforementioned co-pending application" and insert therefor -- U.S. Patent No. 4,123,774 to Hjortzberg --.

Column 3, line 36, delete "inwhich" and insert therefor -- in which --.

Column 5, line 7, delete "anternately" and insert therefor -- alternately --.

Column 9, lines 33-34, delete "the aforementioned co-pending application for U.S. Patent, Serial No. 766,541" and insert therefor -- U.S. Patent No. 4,123,774 --.

Column 10, lines 43-45, delete "the aforementioned co-pending application, Serial No. 766,541" and insert therefor -- U.S. Patent No. 4,123,774 --

UNITED STATES PATENT AND TRADEMARK OFFICE
CERTIFICATE OF CORRECTION

PATENT NO. : 4,217,603          Page 2 of 4

DATED : August 12, 1980

INVENTOR(S) : Bernhard A. Hjortzberg

It is certified that error appears in the above—identified patent and that said Letters Patent is hereby corrected as shown below:

Column 11, line 6, delete "$f_t 0^o$" and insert therefor -- $f_t \angle 0^o$ --;

line 37, after "utilized" insert -- by --;

line 48, delete "corector" and insert therefor -- corrector --.

Column 13, line 30, delete "(BF)" and insert therefor -- (BK) --;

lines 43-44, delete "the aforementioned co-pending application for United States Patent, Serial No. 766,541" and insert therefor -- U.S. Patent No. 4,123,774 --.

Column 14, line 64, delete "democulator" and insert therefor -- demodulator --.

Column 16, line 54, delete "$\angle + 45^o f_t \angle 0^o$" and insert therefor -- $\angle +' 45^o \pm f_t \angle 0^o$ --;

UNITED STATES PATENT AND TRADEMARK OFFICE
CERTIFICATE OF CORRECTION

PATENT NO. : 4,217,603
DATED : August 12, 1980
INVENTOR(S) : Bernhard A. Hjortzberg It is certified that error appears in the above—identified patent and that said Letters Patent is hereby corrected as shown below:

Column 16, line 62, delete "$f_t 110\ 0^\circ$" and insert therefor -- $f_t 110 \angle 0^\circ$ --.

Column 17, line 5, delete "frequenciess" and insert therefor -- frequencies --;
line 11, "$270^\circ$." should be deleted.

Column 18, line 65, ")" should be inserted after -- (R-Y) --;
line 67, ")" should be inserted after -- (R-Y) --.

Column 19, line 6, delete "$12^\circ$+[0.27(B-" and insert therefor -- $12^\circ$+[-0.27(B- --.

Column 21, line 12, delete "31" and insert therefor -- - --;
line 31, delete "⇌" and insert therefor -- + --.

Column 24, line 21, delete "and" and insert therefor -- said --.

UNITED STATES PATENT AND TRADEMARK OFFICE
CERTIFICATE OF CORRECTION

PATENT NO. : 4,217,603

DATED : August 12, 1980

INVENTOR(S) : Bernhard A. Hjortzberg

It is certified that error appears in the above—identified patent and that said Letters Patent is hereby corrected as shown below:

Column 28, line 22, delete "(V-V)" and insert therefor -- (U-V) --.

Column 33, line 13, delete "porportional" and insert therefor -- proportional --.

Column 39, line 17, delete "facilating" and insert therefor -- facilitating --.

Column 40, line 33, delete "different" and insert therefor -- difference --.

Signed and Sealed this

Nineteenth Day of May 1981

[SEAL]

Attest:

RENE D. TEGTMEYER

Attesting Officer

Acting Commissioner of Patents and Trademarks